US011985600B2

(12) United States Patent
Awoniyi-Oteri et al.

(10) Patent No.: US 11,985,600 B2
(45) Date of Patent: May 14, 2024

(54) MULTIMODE SECONDARY CELL GROUP DORMANCY

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 17/394,566

(22) Filed: Aug. 5, 2021

(65) Prior Publication Data

US 2022/0070782 A1 Mar. 3, 2022

Related U.S. Application Data

(60) Provisional application No. 63/074,432, filed on Sep. 3, 2020.

(51) Int. Cl.
*H04W 52/02* (2009.01)
*H04L 5/00* (2006.01)
*H04W 88/06* (2009.01)

(52) U.S. Cl.
CPC ....... *H04W 52/0235* (2013.01); *H04L 5/0048* (2013.01); *H04W 88/06* (2013.01)

(58) Field of Classification Search
CPC . H04W 52/0235; H04W 88/06; H04W 72/23; H04W 76/19; H04W 24/10;
(Continued)

(56) References Cited

U.S. PATENT DOCUMENTS

2017/0170941 A1\* 6/2017 Yang ..................... H04W 24/10
2020/0100179 A1\* 3/2020 Zhou .................. H04W 52/0216
(Continued)

FOREIGN PATENT DOCUMENTS

KR 20220031011 A \* 6/2020
KR 20220031011 A \* 7/2020
(Continued)

OTHER PUBLICATIONS

CATT: "Consideration on Dormant SCG State", 3GPP Draft, 3GPP TSG-RAN WG2 Meeting #108, R2-1914531, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019 Nov. 8, 2019 (Year: 2019).\*

(Continued)

*Primary Examiner* — Ayaz R Sheikh
*Assistant Examiner* — Louis Samara
(74) *Attorney, Agent, or Firm* — Holland & Hart LLP/Qualcomm Incorporated

(57) ABSTRACT

Methods, systems, and devices for wireless communications are described. Generally, the described techniques provide for a user equipment (UE) receiving a configuration for a plurality of dormancy modes for a secondary cell group (SCG) dormancy state. The UE may receive the configuration and determine to transition to a SCG dormancy mode based on the configuration. The UE may enter the dormancy mode and communicate with a master cell group (MCG), the SCG, or both based on the configuration for the dormancy mode. The UE may perform radio resource management, radio link management, and beam failure detection procedures while in SCG dormancy mode. The UE may also perform layer 1 measurements and reporting, timing con- (Continued)

figuration procedures, power control procedures, and the like depending on the dormancy mode.

29 Claims, 14 Drawing Sheets

(58) Field of Classification Search
CPC .......... H04W 52/0216; H04W 36/0072; H04L 5/0048; H04L 5/0091; H04L 1/1896; H04L 1/203
See application file for complete search history.

(56) References Cited

U.S. PATENT DOCUMENTS

| | | | |
|---|---|---|---|
| 2020/0260304 A1* | 8/2020 | Zhou | ................ H04W 72/23 |
| 2020/0260520 A1 | 8/2020 | Jin et al. | |
| 2020/0351682 A1* | 11/2020 | Cirik | ................ H04L 5/0091 |
| 2022/0030659 A1* | 1/2022 | Kim | ................ H04W 76/15 |
| 2022/0086704 A1 | 3/2022 | Futaki et al. | |
| 2022/0117022 A1* | 4/2022 | Cheng | ................ H04W 76/19 |
| 2022/0132344 A1* | 4/2022 | Zhou | ................ H04L 1/203 |
| 2022/0303905 A1* | 9/2022 | Cui | ................ H04W 24/08 |
| 2023/0209463 A1* | 6/2023 | Shih | ................ H04W 52/0216 370/311 |
| 2023/0292194 A1* | 9/2023 | Da Silva | ........... H04W 36/0072 |

FOREIGN PATENT DOCUMENTS

| | | | | |
|---|---|---|---|---|
| KR | 20220031011 A | * | 3/2022 | |
| WO | WO-2020156318 A1 | * | 8/2020 | ........ H04W 52/0209 |
| WO | WO-2020167896 A1 | * | 8/2020 | ............. H04L 69/28 |

OTHER PUBLICATIONS

CATT: "Consideration on Dormant SCG State", 3GPP Draft, 3GPP TSG-RAN WG2 Meeting #108, R2-1914531, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019 Nov. 8, 2019 (Nov. 8, 2019), XP051816597, 3 Pages, Retrieved from the Internet: URL: https://ftp.3gpp.org/tsg_ran/WG2_RL2/TSGR2_108/Docs/R2-1914531.zip R2-1914531.docx [retrieved on Nov. 8, 2019] Section 2.
International Search Report and Written Opinion—PCT/US2021/044927—ISA/EPO—dated Nov. 26, 2021 (207947WO).

* cited by examiner

MULTIMODE SECONDARY CELL GROUP DORMANCY

CROSS REFERENCE

The present Application for Patent claims the benefit of U.S. Provisional Patent Application No. 63/074,432 by Awoniyi-Oteri et al., entitled "MULTIMODE SECONDARY CELL GROUP DORMANCY," filed Sep. 3, 2020, assigned to the assignee hereof, and expressly incorporated by reference herein.

FIELD OF TECHNOLOGY

The following relates to wireless communications, including multimode secondary cell group dormancy.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support communications with multiple base stations. For example, new radio systems may support dual-connectivity, which may allow for a UE to communicate with multiple base stations to support improved throughput and latency. To support dual-connectivity, a UE may be configured with a master cell group (MCG) and a secondary cell group (SCG). A UE may utilize significant processing, power, and memory resources to maintain a connection in both the MCG and the SCG.

SUMMARY

The described techniques relate to improved methods, systems, devices, and apparatuses that support multimode secondary cell group dormancy. Generally, the described techniques provide for a user equipment (UE) receiving a configuration for a plurality of dormancy (e.g., power saving) modes for a secondary cell group (SCG) dormancy (e.g., power saving) state. The UE may receive the configuration and determine to transition to a SCG power saving mode based on the configuration. The UE may enter the power saving mode and communicate with a master cell group (MCG) or the SCG, or both based on the configuration for the power saving mode.

A method for wireless communications at a UE is described. The method may include identifying that the UE is configured to communicate via a secondary cell group, receiving, from a base station, a configuration for a secondary cell group power saving state including a plurality of power saving modes for communicating via the secondary cell group, determining that the UE is to transition to a first power saving mode of the secondary cell group power saving state based on the configuration, and communicating via the secondary cell group in accordance with the configuration for the first power saving mode.

An apparatus for wireless communications at a UE is described. The apparatus may include a processor, memory coupled with the processor, and instructions stored in the memory. The instructions may be executable by the processor to cause the apparatus to identify that the UE is configured to communicate via a secondary cell group, receive, from a base station, a configuration for a secondary cell group power saving state including a plurality of power saving modes for communicating via the secondary cell group, determine that the UE is to transition to a first power saving mode of the secondary cell group power saving state based on the configuration, and communicate via the secondary cell group in accordance with the configuration for the first power saving mode.

Another apparatus for wireless communications at a UE is described. The apparatus may include means for identifying that the UE is configured to communicate via a secondary cell group, means for receiving, from a base station, a configuration for a secondary cell group power saving state including a plurality of power saving modes for communicating via the secondary cell group, means for determining that the UE is to transition to a first power saving mode of the secondary cell group power saving state based on the configuration, and means for communicating via the secondary cell group in accordance with the configuration for the first power saving mode.

A non-transitory computer-readable medium storing code for wireless communications at a UE is described. The code may include instructions executable by a processor to identify that the UE is configured to communicate via a secondary cell group, receive, from a base station, a configuration for a secondary cell group power saving state including a plurality of power saving modes for communicating via the secondary cell group, determine that the UE is to transition to a first power saving mode of the secondary cell group power saving state based on the configuration, and communicate via the secondary cell group in accordance with the configuration for the first power saving mode.

In some examples of the method, apparatuses, and non-transitory computer-readable medium described herein, the configuration may indicate one or more signal measurement thresholds to be used in determining to transition among the plurality of power saving modes.

In some examples of the method, apparatuses, and non-transitory computer-readable medium described herein, each of the plurality of power saving modes may be associated with a different communication activity level in the secondary cell group.

In some examples of the method, apparatuses, and non-transitory computer-readable medium described herein, each different communication activity level corresponds to whether the UE may be to transmit an uplink control channel message on a first resource of the secondary cell group, whether the UE may be to monitor for receipt of a downlink message on a second resource of the secondary cell group, or both.

In some examples of the method, apparatuses, and non-transitory computer-readable medium described herein, the configuration may include three power saving modes for the secondary cell group power saving state.

In some examples of the method, apparatuses, and non-transitory computer-readable medium described herein, receiving the configuration may include operations, features, means, or instructions for receiving an indication of a downlink resource of the secondary cell group for monitoring in one or more of the plurality of power saving modes.

In some examples of the method, apparatuses, and non-transitory computer-readable medium described herein, receiving the configuration may include operations, features, means, or instructions for receiving an indication of an uplink resource of the secondary cell group for transmitting control information in one or more of the plurality of power saving modes.

Some examples of the method, apparatuses, and non-transitory computer-readable medium described herein may further include operations, features, means, or instructions for performing a radio link monitoring procedure, a beam failure detection procedure, or both in accordance with the first power saving mode.

In some examples of the method, apparatuses, and non-transitory computer-readable medium described herein, receiving the configuration may include operations, features, means, or instructions for receiving an indication of whether the UE may be to transmit a physical uplink control channel message on a first resource of a primary-secondary cell (PSCell) of the secondary cell group for each of the plurality of power saving modes and receiving an indication of whether the UE may be to monitor for receipt of a downlink message on a second resource of the PSCell of the secondary cell group for each of the plurality of power saving modes.

In some examples of the method, apparatuses, and non-transitory computer-readable medium described herein, communicating via the secondary cell group may include operations, features, means, or instructions for transmitting a sounding reference signal on the PSCell of the secondary cell group to the secondary node of the secondary cell group in accordance with the first power saving mode.

In some examples of the method, apparatuses, and non-transitory computer-readable medium described herein, determining that the UE may be to transition to the first power saving mode further may include operations, features, means, or instructions for identifying that the UE may be to refrain from transmitting a physical uplink control channel message on a first resource of a PSCell of the secondary cell group in accordance with the received configuration for the first power saving mode and identifying that the UE may be to refrain from monitoring for receipt of a downlink control message on a second resource of the PSCell of the secondary cell group in accordance with the received configuration for the first power saving mode.

Some examples of the method, apparatuses, and non-transitory computer-readable medium described herein may further include operations, features, means, or instructions for transmitting a physical uplink control channel message on a first resource of a PSCell of the secondary cell group in accordance with the first power saving mode and identifying that the UE may be to refrain from monitoring for receipt of a downlink control message on a second resource of the PSCell of the secondary cell group in accordance with the received configuration for the first power saving mode.

Some examples of the method, apparatuses, and non-transitory computer-readable medium described herein may further include operations, features, means, or instructions for transmitting a physical uplink control channel message on a first resource of a PSCell of the secondary cell group in accordance with the received configuration for the first power saving mode and monitoring for receipt of a downlink control message on a second resource of the PSCell of the secondary cell group in accordance with the received configuration for the first power saving mode.

Some examples of the method, apparatuses, and non-transitory computer-readable medium described herein may further include operations, features, means, or instructions for receiving a downlink control message on a resource of a PSCell of the secondary cell group in accordance with the received configuration for the first power saving mode, where the downlink control message indicates one or more timing adjustment parameters, one or more power control parameters, one or more beam adjustment parameters, or a combination thereof.

Some examples of the method, apparatuses, and non-transitory computer-readable medium described herein may further include operations, features, means, or instructions for receiving a downlink control message on a resource of a master cell group in accordance with the received configuration for the first power saving mode, where the downlink control message indicates one or more timing adjustment parameters, one or more power control parameters, one or more beam adjustment parameters, or a combination thereof.

In some examples of the method, apparatuses, and non-transitory computer-readable medium described herein, measuring, in the first power saving mode, a first signal transmitted using a downlink resource of a PSCell of the secondary cell group, a second signal transmitted using a downlink resource of a secondary cell of the secondary cell group, or measuring both the first signal and the second signal and transmitting a result of the measuring on an uplink resource of the PSCell.

Some examples of the method, apparatuses, and non-transitory computer-readable medium described herein may further include operations, features, means, or instructions for measuring both the first signal and the second signal based on the PSCell operating in a first frequency and the secondary cell operating in a second frequency different from the first frequency.

Some examples of the method, apparatuses, and non-transitory computer-readable medium described herein may further include operations, features, means, or instructions for measuring the first signal and refraining from measuring the second signal based on the PSCell and the secondary cell operating in a first frequency.

In some examples of the method, apparatuses, and non-transitory computer-readable medium described herein, determining that the UE may be to transition to the first power saving mode may include operations, features, means, or instructions for determining that a signal measurement corresponding to the secondary cell group satisfies a signal measurement threshold and transitioning, based on determining the signal measurement satisfies the signal measurement threshold, to the first power saving mode that may be associated with a lower communication activity level than a second power saving mode of the plurality of power saving modes.

In some examples of the method, apparatuses, and non-transitory computer-readable medium described herein, determining that the UE may be to transition to the first power saving mode may include operations, features, means, or instructions for determining that a signal measurement corresponding to the secondary cell group fails to satisfy a signal measurement threshold and transitioning, based on determining that the signal measurement fails to satisfy the signal measurement threshold, to the first power saving mode that may be associated with a higher communication activity level than a second power saving mode of the plurality of power saving modes.

Some examples of the method, apparatuses, and non-transitory computer-readable medium described herein may further include operations, features, means, or instructions for comparing a signal measurement corresponding to the secondary cell group to a signal measurement threshold and determining that the UE may be to transition from the first power saving mode to a second power saving mode of the plurality of power saving modes based on the comparing.

Some examples of the method, apparatuses, and non-transitory computer-readable medium described herein may further include operations, features, means, or instructions for receiving from the base station, an instruction to transition to the first power saving mode or from the first power saving mode to a second power saving mode of the plurality of power saving modes.

Some examples of the method, apparatuses, and non-transitory computer-readable medium described herein may further include operations, features, means, or instructions for transmitting, to a secondary node of the base station via a secondary cell group, a sounding reference signal, where the instruction to transition may be received from the base station based on transmitting the sounding reference signal.

Some examples of the method, apparatuses, and non-transitory computer-readable medium described herein may further include operations, features, means, or instructions for transmitting, to the base station, a request to transition to the secondary cell group power saving state based on an overheating condition, a traffic condition, a condition associated with the secondary cell group, or a combination thereof, where the instruction to transition to the first power saving mode may be received based on transmitting the request.

Some examples of the method, apparatuses, and non-transitory computer-readable medium described herein may further include operations, features, means, or instructions for detecting a beam failure or a radio link failure while the UE may be in the first power saving mode that may be associated with a lowest communication activity level of the plurality of power saving modes and transmitting, to the base station, a random access request based on detecting the beam failure or the radio link failure.

A method for wireless communications at a base station is described. The method may include identifying that the base station is in communication with a UE as part of a master cell group, transmitting, to the UE, a configuration for a secondary cell group power saving state including a plurality of power saving modes for a secondary cell group with which the UE is in communication, and communicating with the UE in accordance with the configuration.

An apparatus for wireless communications at a base station is described. The apparatus may include a processor, memory coupled with the processor, and instructions stored in the memory. The instructions may be executable by the processor to cause the apparatus to identify that the base station is in communication with a UE as part of a master cell group, transmit, to the UE, a configuration for a secondary cell group power saving state including a plurality of power saving modes for a secondary cell group with which the UE is in communication, and communicate with the UE in accordance with the configuration.

Another apparatus for wireless communications at a base station is described. The apparatus may include means for identifying that the base station is in communication with a UE as part of a master cell group, means for transmitting, to the UE, a configuration for a secondary cell group power saving state including a plurality of power saving modes for a secondary cell group with which the UE is in communication, and means for communicating with the UE in accordance with the configuration.

A non-transitory computer-readable medium storing code for wireless communications at a base station is described. The code may include instructions executable by a processor to identify that the base station is in communication with a UE as part of a master cell group, transmit, to the UE, a configuration for a secondary cell group power saving state including a plurality of power saving modes for a secondary cell group with which the UE is in communication, and communicate with the UE in accordance with the configuration.

Some examples of the method, apparatuses, and non-transitory computer-readable medium described herein may further include operations, features, means, or instructions for including, within the configuration, one or more signal measurement thresholds to be used in determining to transition among the plurality of power saving modes.

In some examples of the method, apparatuses, and non-transitory computer-readable medium described herein, the power saving mode configuration indicates that each of the plurality of power saving modes may be associated with a different communication activity level in the secondary cell group.

In some examples of the method, apparatuses, and non-transitory computer-readable medium described herein, each different communication activity level corresponds to whether the UE may be to transmit an uplink control channel message on a first resource of the secondary cell group, the UE may be to monitor for receipt of a downlink message on a second resource of the secondary cell group, or both.

In some examples of the method, apparatuses, and non-transitory computer-readable medium described herein, transmitting the configuration may include operations, features, means, or instructions for transmitting a power saving mode configuration for three power saving modes.

In some examples of the method, apparatuses, and non-transitory computer-readable medium described herein, transmitting the configuration may include operations, features, means, or instructions for transmitting an indication of a downlink resource of the secondary cell group for UE monitoring in one or more of the plurality of power saving modes.

In some examples of the method, apparatuses, and non-transitory computer-readable medium described herein, transmitting the configuration may include operations, features, means, or instructions for transmitting an indication of an uplink resource of the secondary cell group that the UE may be to use to transmit control information in one or more of the plurality of power saving modes.

In some examples of the method, apparatuses, and non-transitory computer-readable medium described herein, transmitting the configuration may include operations, features, means, or instructions for transmitting an indication that the UE may be to perform a radio link monitoring procedure, a beam failure detection procedure, or both in each of the plurality of power saving modes.

In some examples of the method, apparatuses, and non-transitory computer-readable medium described herein, transmitting the configuration may include operations, features, means, or instructions for transmitting an indication of whether the UE may be to transmit a physical uplink control channel message on a first resource of a PSCell of the secondary cell group for each of the plurality of power saving modes and transmitting an indication of whether the UE may be to monitor for receipt of a downlink message on a second resource of the PSCell of the secondary cell group for each of the plurality of power saving modes.

In some examples of the method, apparatuses, and non-transitory computer-readable medium described herein, communicating with the UE may include operations, features, means, or instructions for receiving, from the UE on a secondary node of the base station, a sounding reference signal in accordance with the configuration.

In some examples of the method, apparatuses, and non-transitory computer-readable medium described herein, transmitting the configuration may include operations, features, means, or instructions for transmitting a configuration for a first power saving mode that indicates that the UE may be to refrain from transmitting a physical uplink control channel message on a first resource of a PSCell of the secondary cell group and that the UE may be to refrain from monitoring for receipt of a downlink control message on a second resource of the PSCell of the secondary cell group.

In some examples of the method, apparatuses, and non-transitory computer-readable medium described herein, transmitting the configuration may include operations, features, means, or instructions for transmitting a configuration for a first power saving mode that indicates that the UE may be to transmit a physical uplink control channel message on a first resource of a PSCell of the secondary cell group and that the UE may be to refrain from monitoring for receipt of a downlink control message on a second resource of the PSCell of the secondary cell group.

In some examples of the method, apparatuses, and non-transitory computer-readable medium described herein, transmitting the configuration may include operations, features, means, or instructions for transmitting a configuration for a first power saving mode that indicates that the UE may be to transmit a physical uplink control channel message on a first resource of a PSCell of the secondary cell group and monitor for receipt of a downlink control message on a second resource of the PSCell of the secondary cell group.

Some examples of the method, apparatuses, and non-transitory computer-readable medium described herein may further include operations, features, means, or instructions for transmitting a downlink control message on a resource of the master cell group in accordance with the transmitted configuration, where the downlink control message indicates one or more timing adjustment parameters, one or more power control parameters, one or more beam adjustment parameters, or a combination thereof.

Some examples of the method, apparatuses, and non-transitory computer-readable medium described herein may further include operations, features, means, or instructions for transmitting, to the UE, an instruction to transition to a first power saving mode of the plurality of power saving modes or from the first power saving mode to a second power saving mode of the plurality of power saving modes.

Some examples of the method, apparatuses, and non-transitory computer-readable medium described herein may further include operations, features, means, or instructions for receiving, from the UE on a secondary node of the base station, a sounding reference signal, where the instruction to transition may be transmitted to the UE based on receiving the sounding reference signal.

Some examples of the method, apparatuses, and non-transitory computer-readable medium described herein may further include operations, features, means, or instructions for receiving, from the UE, a request to transition to the secondary cell group power saving state, where the instruction to transition may be transmitted to the UE based on receiving the request.

Some examples of the method, apparatuses, and non-transitory computer-readable medium described herein may further include operations, features, means, or instructions for receiving, from the UE while the UE may be operating in one of the plurality of power saving modes, a random access request and transmitting, to the UE, a random access response based on receiving the random access request.

DETAILED DESCRIPTION

Figure 1:
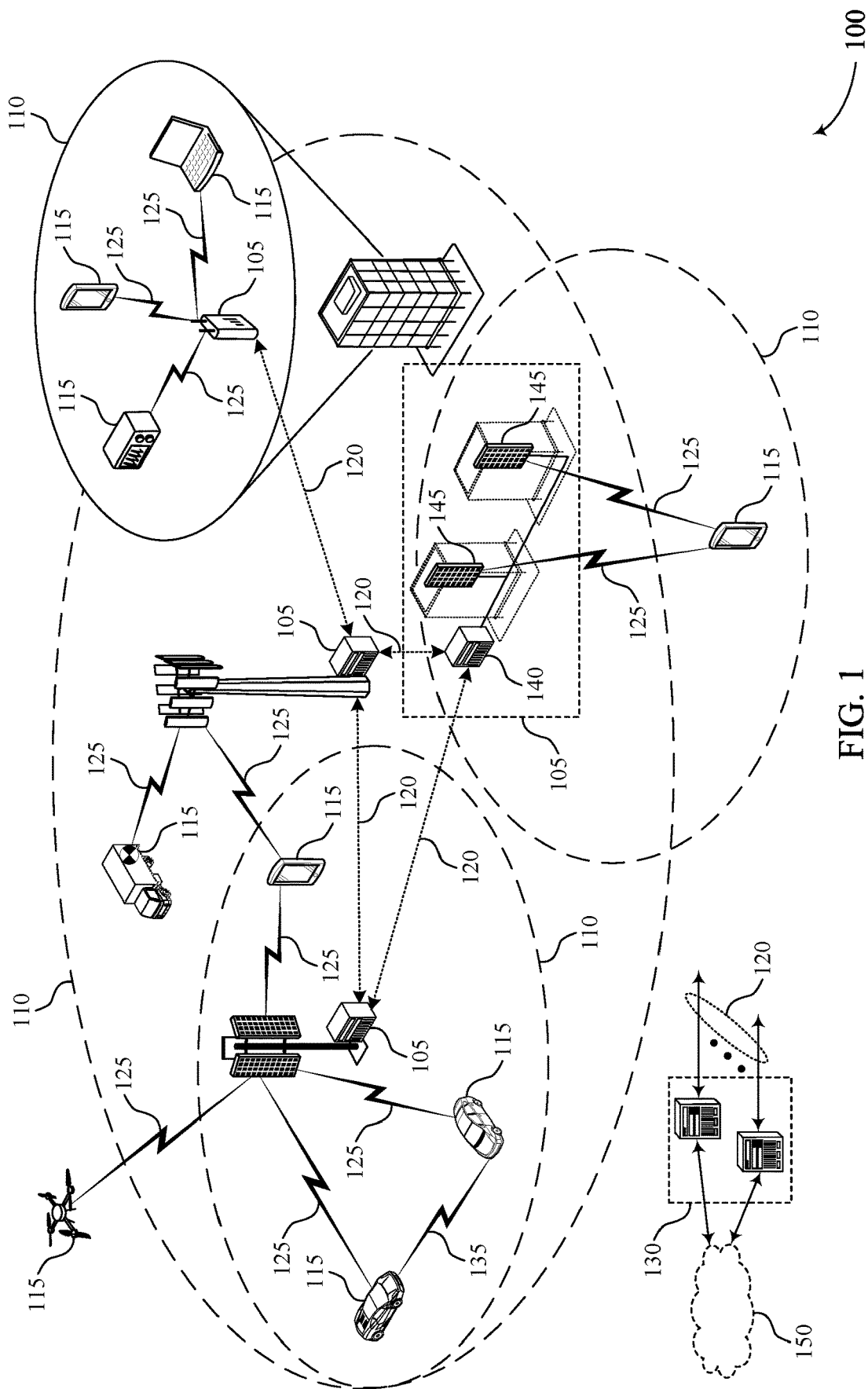
FIG. 1 illustrates an example of a system for wireless communications that supports multimode secondary cell group dormancy in accordance with aspects of the present disclosure.

Some wireless communications systems may support communications with multiple base stations. For example, new radio systems may support dual-connectivity, which may allow for a UE to communicate with multiple base stations to support improved throughput and latency. To support dual-connectivity, a UE may be configured with a master cell group (MCG) and a secondary cell group (SCG). A UE may utilize significant processing, power, and memory resources to maintain a connection in both the MCG and the SCG.

Aspects of the disclosure described herein support a dormancy state for a SCG that is configured at a UE. Within the dormancy state, various aspects of a communication in the SCG may be disabled or suspended to, for example, save power. As such, a dormancy state may be referred to as a power saving state. In one example, the SCG dormancy state includes three dormancy modes (e.g., power saving modes), with various levels of activity. A base station may configure the UE with the dormancy states, communication activities within each state, and signal measurement thresholds to be used to identify which of the dormancy states in which the UE is to operate. In each of the dormancy states described herein, the UE may perform radio link monitoring (RLM) procedures, beam failure detection (BFD) procedures, radio resource management (RRM) procedures, etc. Whether the UE is to perform measurements in the SCG, report the measurements, monitor control channels in the SCG, among other services, may depend on the dormancy mode. In a first dormancy mode, which may be the mode corresponding to a least amount of communication activity in the SCG dormancy state, the UE may perform RRM, RLM, and BFD procedures but may not perform measurements, sounding procedures, physical uplink control channel (PUCCH) transmission, or downlink channel monitoring in the SCG. In a second dormancy mode, the UE may perform layer 1 measurements, reporting, and sounding procedures, but may not monitor for downlink transmissions on the primary-secondary cell (PSCell) of the SCG. In a third dormancy mode, which may be referred to a mode corresponding to the most amount of communication activity in the SCG dormancy state, the UE may perform layer 1 measurements, reporting, and sounding procedures in addition to transmission in the PUCCH of the PSCell and physical downlink control channel (PDCCH) monitoring on the PSCell.

Particular aspects of the subject matter described herein may be implemented to realize one or more advantages. The described techniques may support improvements in the dual-connectivity and carrier-aggregation framework, decreasing signaling overhead, and improving reliability, among other advantages. As such, supported techniques may include improved network operations and, in some examples, may promote network efficiencies, among other benefits.

Aspects of the disclosure are initially described in the context of wireless communications systems. Aspects of the disclosure are further described with respect to a wireless communications system, deployment scenarios, and a process flow diagram. Aspects of the disclosure are further illustrated by and described with reference to apparatus diagrams, system diagrams, and flowcharts that relate to multimode secondary cell group dormancy.

FIG. 1 illustrates an example of a wireless communications system 100 that supports multimode secondary cell group dormancy in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

As described herein, the wireless communications system 100 may support dual-connectivity and carrier aggregation. To support these features, a UE 115 may be configured with a MCG and a SCG. In some aspects, the MCG may include a primary cell (PCell) and one or more secondary cells (SCells), and each cell of the MCG may be associated with a first RAT, such as LTE. In these and other aspects, the SCG may include a PSCell and one or more SCells that are associated with a second RAT, such as 5G. By utilizing the MCG and the SCG, the UE may maintain a connection in multiple base stations and/or RATs such as to support increased latency and throughput. The UE 115 may utilize significant resources, such as processing, memory, and power resources to maintain a connection in both the MCG and the SCG.

Implementations described herein support a dormancy or suspension state for the SCG, and the dormancy state may include a plurality of dormancy modes. A dormancy mode of the SCG dormancy state may be associated with reduced communication activity in the SCG. For example, a UE 115 may not maintain an active connection (e.g., physical downlink shared channel (PDSCH) monitoring or physical uplink shared channel (PUSCH) transmission) in the SCG while in one of the dormancy modes. As such, the UE 115 may improve processing, power, and memory efficiencies. Further, each dormancy mode of the plurality of dormancy modes may be associated with a different level of communication activity, and the respective mode that the UE is using may depend on the link quality or signal power of the SCG. Thus, if the SCG is associated with poor signal strength or poor quality, then the UE 115 may utilize the SCG dormancy mode with a higher level of activity, which includes layer 1 measurement and reporting and control channel monitoring. If the SCG is associated with high signal strength or quality, then the UE 115 may utilize a SCG dormancy mode with a lower level of activity, in which the UE may not perform layer 1 measurement and reporting. The UE 115 may utilize the RLM to detect radio link failure and BFD to detect beam failures while in a dormancy mode. Further, the layer 1 measurements may be used to track and maintain an adequate or good beam quality during SCG dormancy. Sounding reference signal (SRS) transmissions may be used to track and maintain timing and uplink transmission power. Beam update, timing adjustment and power control procedures may be performed during dormancy to enable fast transitions from SCG dormancy state to SCG active state, especially for scenarios with overlapping dormant and active bandwidth parts. Beam update, timing adjustment, and power control procedures during dormancy may avoid or limit the need for frequent random access channel (RACH) procedures on the PSCell. As such, by using multiple modes, the UE 115 may adapt based on link qualities while reducing processing, memory, and power consumption in the SCG. Accordingly, in some examples, a SCG dormancy state may be referred to as a SCG power saving state and a SCG dormancy mode may be referred to as a power saving mode.

Figure 2:
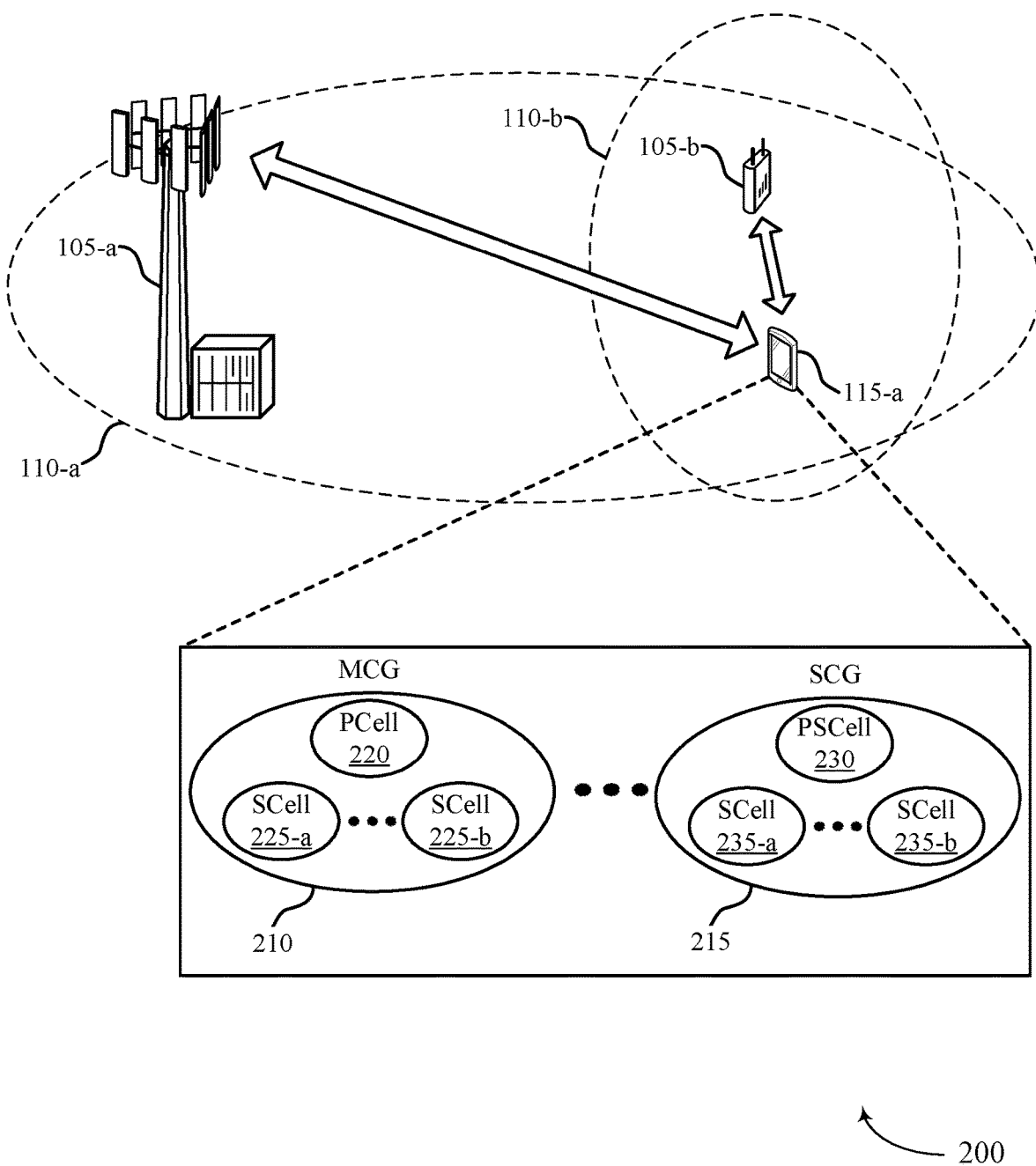
FIG. 2 illustrates an example of a wireless communications system that supports multimode secondary cell group dormancy in accordance with aspects of the present disclosure.

FIG. 2 illustrates an example of a wireless communications system 200 that supports multimode secondary cell group dormancy in accordance with aspects of the present disclosure. In some examples, wireless communications system 200 may implement aspects of wireless communication system 100. The wireless communications system 200 includes base station 105-*a*, base station 105-*b*, and UE 115-*a*, which may be examples of the corresponding devices of FIG. 1. Base station 105-*a* may support communications with various UEs 115 in coverage area 110-*a*, and base station 105-*b* may support communications with various UEs 115 in coverage area 110-*b*. In some cases, base station 105-*a* may support communications with UEs 115 in coverage area 110-*a* using a first RAT, such as LTE, while base station 105-*b* may support communications with UEs 115 in coverage area 110-*b* using a second RAT, such as 5G.

One of the base stations 105, such as base station 105-*a*, may configure the UE 115 with various cells that may be used to communicate with network. For example, the base station 105-*a* may configure the UE 115-*a* with cells that are associated with neighboring base stations 105. As such, when the UE 115-*a* moves about a geographic area, the UE 115 may use the configuration for the neighboring cells to efficiently establish or maintain a connection with the network. In some examples, the UE 115 may communicate with the network using multiple cells or carriers, which may be referred to as dual-connectivity or carrier aggregation. In a dual-connectivity scenario, a UE 115 may communicate with a master base station 105 and a secondary base station 105. The master base station 105 may be associated with a master cell group 210, and a secondary base station 105 may be associated with a secondary cell group 215. The master base station 105 may configure the UE 115 with information associated with the master base station 105 and the secondary base station 105. In some cases, the master cell group 210 and the secondary cell group 215 may be associated with a same base station 105-*a*. For example, base station 105-*a* may support a master node (MN) associated with the master cell group 210 and one or more secondary node (SN) that are associated with the secondary cell group 215. The master node and the secondary nodes may be physically or logically separate components of the base station 105-*a*.

As illustrated in FIG. 2, the UE 115-*a* may be an example of a master base station, and the base station 105-*b* may be an example of a secondary base station. The master base station 105-*b* may configure the UE 115-*a* with a MCG 210 and a SCG 215. For example, the base station 105-*a* may configure the UE 115-*a* with the MCG 210 and the SCG 215 using one or more system information block (SIB) messages. The MCG 210 includes a PCell 220 and one or more SCells 225. The SCG 215 includes a PSCell 230 and one or more SCells 235. As described herein, the UE 115-*a* may maintain a communication link with the base station 105-*a* using one or more cells of the MCG 210. Further, the UE 115-*a* may maintain a communication link with the secondary base station 105-*b* using one or more cells of the SCG 215. However, if the UE 115 maintains an active link, meaning that the UE 115-*a* transmits and monitors for receipt of shared channel messages (PUSCH messages and PDSCH messages), then the UE 115-*a* may utilize significant resources, such as processing, memory, and power resources.

In accordance with the techniques described herein, the UE 115-*a* may enter a SCG dormancy state, in which the UE 115-*a* may not actively transmit PUSCH messages or monitor for receipt of PDSCH messages in the SCG 215. In such cases, the UE 115-a may maintain a connection with the SCG 215 by performing RLM, RRM, and BFD procedures in the SCG 215, but since the UE 115-a may not actively transmit PUSCH or monitor for receipt of PDSCH messages, the UE 115-a may reduce the use of resources. The UE 115-a may enter the SCG dormancy state based on an instruction received from the base station 105-a. For example, the base station may detect or the UE 115-a may indicate to the base station 105-a that the SCG is in a low activity state, that the transmissions in the SCG are bursty, or that the UE 115-a is overheating. It should be understood that other conditions may cause the base station 105-a to instruct the UE 115-a to enter the SCG dormancy state.

As described herein, the SCG dormancy state may include a plurality of dormancy modes, and each dormancy mode may be associated with various levels of activity within the cells of the SCG 215. The base station 105-a may configure the UE 115-a with one or more measurement thresholds that the UE 115-a is to use for identifying which dormancy mode to enter. Further, the base station 105-a may configure the UE 115-a with resources to use and/or to monitor while in each of the plurality of dormancy states. The base station 105-a may configure the UE 115-a with the resources for each mode at the beginning of SCG dormancy. In a first dormancy mode, which may be referred to a low activity dormancy mode (e.g., mode 0), the UE 115-a may perform RRM, RLM, and BFD procedures in the SCG 215 by monitoring the respective reference signals transmitted via the SCG 215, but the UE 115-a may not perform any layer 1 measurements, reporting, and sounding procedures in the SCG 215. For example, the UE 115-a may monitor the RLM-RS for radio link monitoring and monitor the BFD-RS for beam failure detection. The low dormancy state (mode 0) may be used when the UE 115-a identifies a high signal strength/quality in the SCG 215. As such, the signal measurement threshold associated with entering the low dormancy state may be a high signal measurement threshold relative to other thresholds.

In a second dormancy mode, which may be referred to a mid-activity level dormancy mode (e.g., mode 1), the UE 115-a may perform RRM, RLM, and BFD procedures in the SCG 215 (as discussed with respect to mode 0). In addition, the UE 115-a may perform layer 1 measurements, reporting, and sounding procedures. That is, the UE 115-a may measure reference signals (e.g., CSI-RS) transmitted by the base station 105-b in the PSCell 230, one or more SCells 235, or both the PSCell 230 and the one or more SCells 235 in the SCG 215 and report the result of the measurements to the base station 105-b using PUCCH resources of the PSCell 230. However, in mode 1, the UE 115-a may not monitor for downlink control transmissions on the PDCCH of the PSCell 230. Mode 2 may be used when the UE 115-a identifies a fair signal strength/quality in the SCG 215. As such, the signal measurement threshold associated with entering mode 1 may be a medium level signal measurement threshold relative to other thresholds.

In a third dormancy mode, which may be referred to as a high-activity level dormancy mode (e.g., mode 2), the UE may perform RRM, RLM, and BFD procedures in the SCG 215 (as discussed with respect to mode 0 and mode 1). In addition, the UE 115-a may perform layer 1 measurements, reporting, and sounding procedures. Thus, the UE 115-a may measure reference signals transmitted by the base station 105-b in the PSCell 230, one or more SCells 235-a, or both in the SCG 215 and report the result of the measurements to the base station 105-b using PUCCH resources of the PSCell 230. Further, in mode 2, the UE 115-a may monitor for downlink (DL) control transmissions on the PDCCH of the PSCell 230. Mode 2 may be used when the UE 115-a identifies a poor signal strength/quality in the SCG 215. As such, the signal measurement threshold associated with entering mode 1 may be a low level signal measurement threshold relative to other thresholds.

As described, the various dormancy modes may be summarized as shown in the following Table 1:

TABLE 1

| Mode 0 | Mode 1 | Mode 2 |
|---|---|---|
| RRM | RRM | RRM |
| RLM and BFD | RLM and BFD | RLM and BFD |
| No L1 measurements, reporting, and sounding procedures | L1 measurements, reporting, and sounding procedures PUCCH on PSCell No DL on PSCell | L1 measurements, reporting, and sounding procedures PUCCH on PSCell PDCCH on PSCell |

As described, the transition between dormancy modes may be based on the layer 1 measurement reports of the downlink reference signals and the sounding reference signals transmitted via uplink (UL) resources by the UE 115-a. In one example, the UE 115-a may start in mode 2 such that the network may receive adequate layer 1 measurement reports from the UE 115-a that are based on channel state information (CSI) measurements or sounding measurements at the base station 105-a or 105-b. Base on the measurements, the base station 105-a may cause transition (or the UE 115-a may determine to transition) to another mode in accordance with the following Table 2:

TABLE 2

| | Next State | | |
|---|---|---|---|
| Present State | Mode 0 | Mode 1 | Mode 2 |
| Mode 2 | Good/excellent signal strength | Fair signal strength | Poor signal strength |
| Mode 1 | Good/excellent signal strength | Fair signal strength | Poor signal strength |

In environments where the base station 105-a supports both the master node associated with the master cell group 210 and the secondary node associated with the secondary cell group 215, the sounding reference signal may be transmitted by the UE 115-a to the secondary node, and the master node may transmit an instruction to transition to another mode based on the sounding reference signal transmitted by the UE 115-a via the secondary cell group to the secondary node. Similarly, when the master node and secondary node are physically separated (e.g., the master node is in base station 105-a and the secondary node is in base station 105-b), the base stations 105-a and 105-b may exchange reports of the sounding reference signals (and other measurements such as CSI-Reports) using wired or wireless backhaul links.

When the UE is in mode 0, since there are no layer 1 measurements, the UE may not be able to transition directly to mode 1 or mode 2, but may rely on BFD and RLM to restore the connection on the SCG 215. That is, the UE 115-a may transition to an active state on the SCG 215 by transmitting a random access request on random access channel (RACH) resources. Once the connection is established, the UE 115-a may enter a mode 1 or mode 2 dormancy state. Thus, if the UE 115-a detects a radio link failure or a beam failure in the SCG 215 while in mode 0, the UE 115-a may transmit the random access request in order to reestablish a connection. However, if the UE 115-a is operating in mode 1 or mode 2 dormancy state, then the UE 115-a may receive beam updates periodically or upon a detected beam failure. In mode 1, since the UE 115-a does not monitor for receipt of the PDCCH, the UE 115-a may receive the beam updates via a control channel (e.g., PDCCH) of the MCG 210. However, in mode 2, the UE 115-a may monitor for receipt of the beam updates in the PDCCH of the SCG 215. Thus, in mode 1, since the beam updates for the SCG 215 are received via the MCG 210, there may be a communication delay.

Figure 3A:
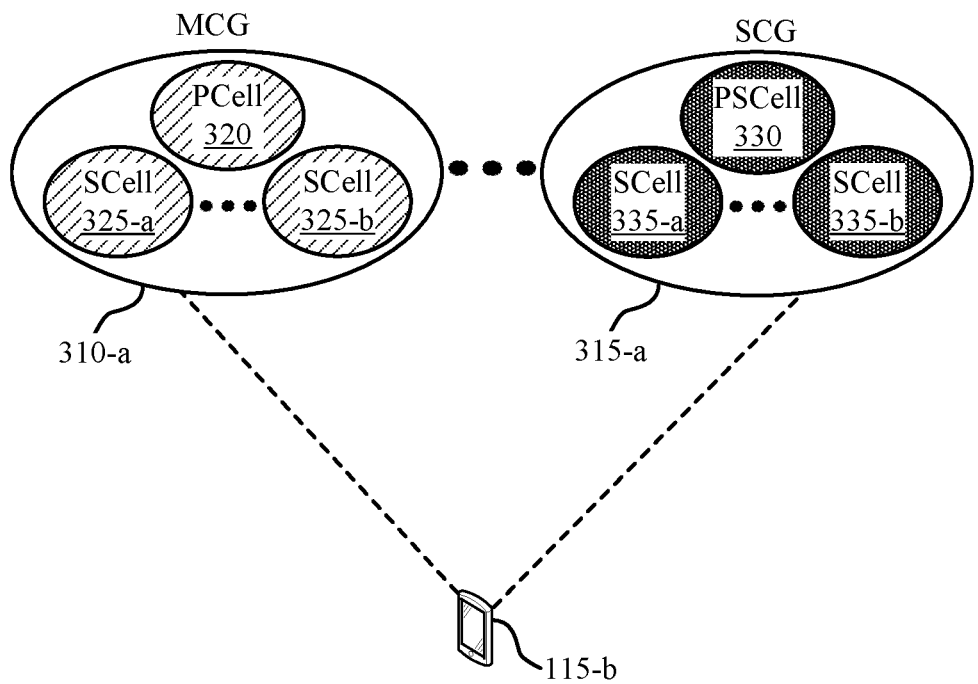
FIG. 3A and FIG. 3B illustrate examples of deployment scenarios that support multimode secondary cell group dormancy in accordance with aspects of the present disclosure.
Figure 3B:
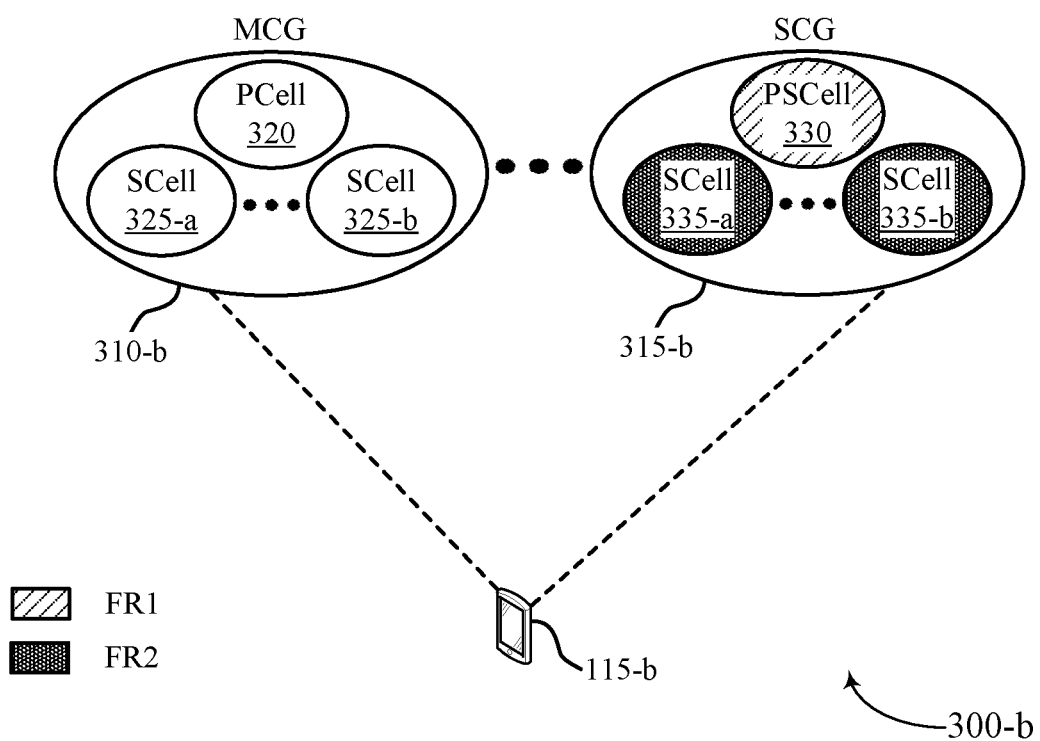

Similar to the beam update procedures, timing adjustment and power control procedures may be performed dependent on the dormancy mode in which the UE 115-a is operating. In mode 0, the UE 115-a may not perform timing adjustment or power control. In modes 1 and 2, the UE 115-a may perform timing adjustment and power control. However, in mode 1, the timing adjustment and power control parameters may be received via the PDCCH of the MCG 210, which may result in a communication delay. In mode 2, the timing adjustment and power control parameters may be received via the PDCCH of the SCG 215. A comparison of tracking, performance, transition latency, and power consumption and various tradeoffs for dormancy modes are summarized in the following Table 3:

FIG. 3A and FIG. 3B illustrate examples of deployment scenarios 300 that support multimode secondary cell group dormancy in accordance with aspects of the present disclosure. In some examples, deployment scenarios 300 may implement aspects of wireless communication system 100. The deployment scenarios 300 include a UE 115-b, which may be an example of the UEs 115 as described with respect to FIGS. 1 and 2. The UE 115-b may be configured with a MCG 310 and a SCG 315 by a base station 105. In some examples, a MCG 310 and a SCG 315 may be examples of a MCG 210 and a SCG 215, respectively, as described with respect to FIG. 2. The MCG 310 includes a PCell 320 and one or more SCells 325. The SCG 315 includes a PSCell 330 and one or more SCells 335.

In FIG. 3A, the deployment scenario 300-a is an intra-band carrier aggregation deployment scenario, in which the cells of the SCG 315-a operate in a same frequency band, such as FR1. In FIG. 3A, the MCG 310-a may operate in another frequency band, such as FR2. In the SCG 315-a deployment scenario 300-a, the measurements performed by UE 115 on a PSCell 330 may be highly correlated to measurements performed on the SCells 335 of the SCG 315-a. As such, when in a dormancy mode in which the UE

TABLE 3

| | Metric | Mode 0 (RLM + BFD) | Mode 1 (RLM + BFD + PUCCH on PSCell) | Mode 2 (RLM + BFD + PUCCH + PDCCH on PSCell |
|---|---|---|---|---|
| Tracking | Beam Failure Beam Updates | No beam updates | Beam failure DL/UL P1 beams via MCG (e.g., with communication delay) | DL/UL P1 beams |
| | Timing Adjustment and Power Control | No timing adjustment and power control | Timing adjustment and power control in some cases via MCG (e.g., with communication delay) | Timing adjustment and power control |
| | Tracking Performance | Fair | Good | Great |
| | Transition Latency | Slow | Fast | Faster |
| | Power Consumption on PSCell | Minimal | Moderate | Moderate/high |

It should be understood that the UE 115-a may maintain an active connection with the base station 105-a via the MCG 210 while the UE 115-a is one of the SCG dormancy modes. Thus, the UE 115-a may still communicate with the network, receive PDSCH messages, transmit PUSCH messages, and the like via the MCG 210. Further, updates for the SCG 215 may be received via the MCG 210 in accordance with the respective dormancy mode in which the UE 115-a is operating.

115-a performs measurements of the SCG 315-a (e.g., mode 1 or mode 2), then the UE 115-a may perform measurements on the PSCell 330 or SCells 335 rather than both the PSCell 330 and the SCells 335. That is, if the UE is operating in an intra-band carrier aggregation dual-connectivity procedure as illustrated in 3A, the UE 115-a may perform measurements of the PSCell 330. The following Table 4 may summarize the various dormancy modes for the deployment scenario 300-a:

TABLE 4

| Measurement Type | Channel Direction | Mode 0 (RLM + BFD) | Mode 1 (RLM + BFD + PUCCH on PSCell) | Mode 2 (RLM + BFD + PUCCH + PDCCH on PSCell |
|---|---|---|---|---|
| RLM and BFD | DL | RLM-RS/BFD-RS on PSCell if configured | | |
| | UL | Radio Link Failure Report/beam Failure Report via MCG | | |
| | | Beam failure report via PSCell (e.g., RACH) | | |
| L1 Measurement, | DL | None | CSI-RS on PSCell Beam Updates/timing | CSI-RS on PSCell |

TABLE 4-continued

| Measurement Type | Channel Direction | Mode 0 (RLM + BFD) | Mode 1 (RLM + BFD + PUCCH on PSCell) | Mode 2 (RLM + BFD + PUCCH + PDCCH on PSCell) |
|---|---|---|---|---|
| Reporting, and Sounding Procedure | | | adjustment commands/power control commands via MCG | Beam Updates/timing adjustment commands/power control commands via PDCCH |
| | UL | None | Measurement report for PSCell using PUCCH on PSCell SRS on PSCell | |

In FIG. 3B, the deployment scenario 300-b is an inter-band carrier aggregation dual-connectivity deployment scenario, in which the cells of the SCG 315-b operate in a different frequency band. For example, the PSCell 330 may operate in FR1, while the SCells 335 of the SCG 315-b may operate in a different frequency band, such as FR2. As such, the measurements of the PSCell 330 may not correlate to the measurements of the SCells 335. In such a scenario, while the UE is one of the SCG dormancy modes (e.g., mode 1 or mode 2), the UE 115-b may perform measurements of reference signals of both the PSCell 330 and the SCells 335 of the SCG 315-b. The following Table 5 may summarize the various dormancy modes for the deployment scenario 300-b:

TABLE 5

| Measurement Type | Channel Direction | Mode 0 (RLM + BFD) | Mode 1 (RLM + BFD + PUCCH on PSCell) | Mode 2 (RLM + BFD + PUCCH + PDCCH on PSCell |
|---|---|---|---|---|
| RLM and BFD | DL | RLM-RS/BFD-RS on PSCell and SCells if configured | | |
| | UL | Radio Link Failure Report/beam Failure Report via MCG Beam failure report via PSCell (e.g., RACH) | | |
| L1 Measurement, Reporting, and Sounding Procedure | DL | None | CSI-RS on PSCell and SCells Beam Updates/timing adjustment commands/power control commands via MCG | CSI-RS on PSCell and SCells Beam Updates/timing adjustment commands/power control commands via PDCCH |
| | UL | None | Measurement report for PSCell and SCells using PUCCH on PSCell SRS on PSCell | |

Thus, depending on the deployment scenario, the UE 115-a may perform measurements (e.g., CSI-RS measurements) on the PSCell or both the PSCell and the SCells of the SCG 315. However, the reports of the measurements (e.g., of the PSCell or both the PSCell and the SCell) may be transmitted on the PUCCH of the PSCell.

Figure 4:
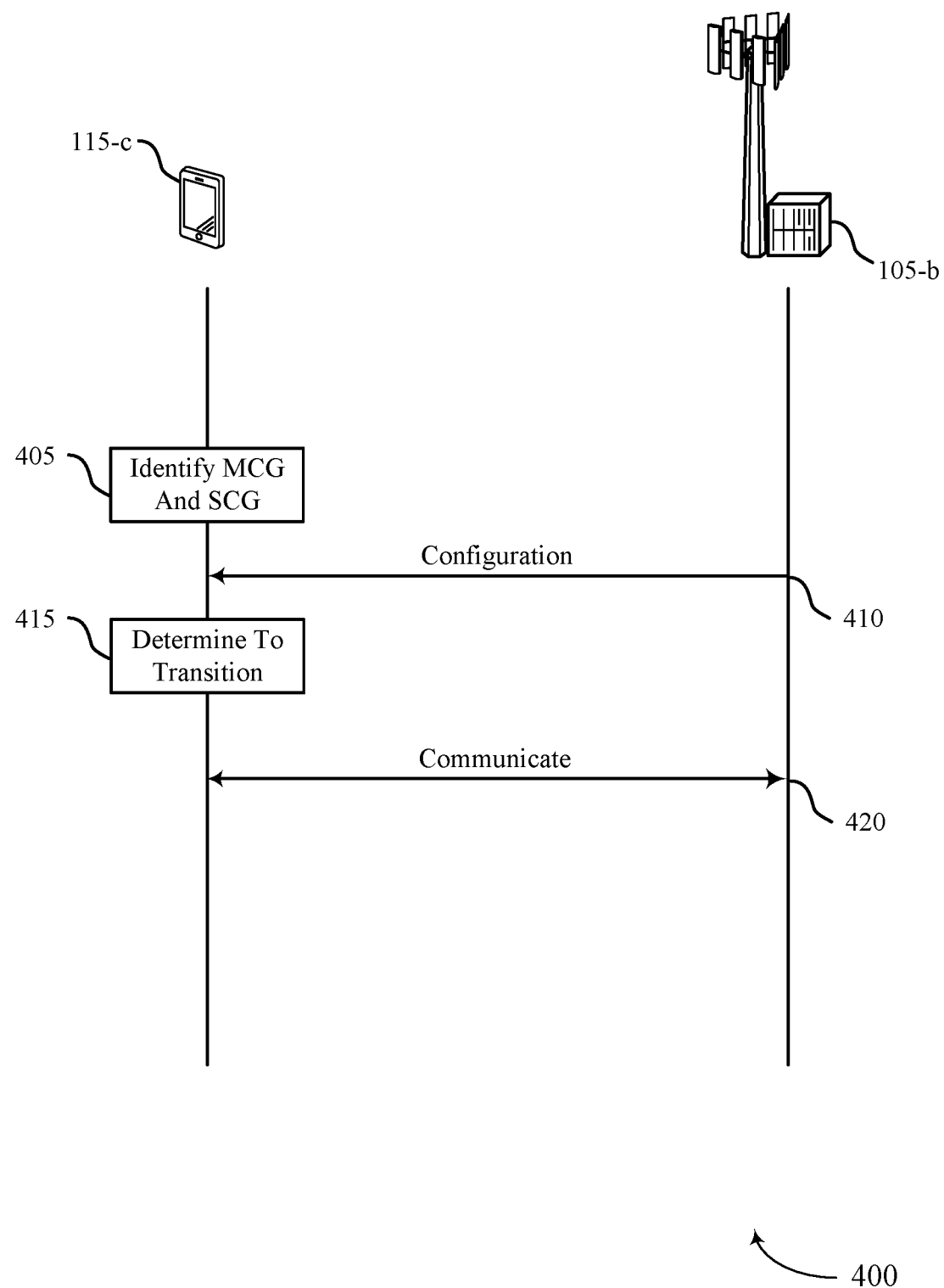
FIG. 4 illustrates an example of a process flow diagram that supports multimode secondary cell group dormancy in accordance with aspects of the present disclosure.

FIG. 4 illustrates an example of a process flow diagram 400 that supports multimode secondary cell group dormancy in accordance with aspects of the present disclosure. In some examples, process flow diagram 400 may implement aspects of wireless communication system 100. The process flow diagram includes a base station 105-c, and a UE 115-c, which may be examples of the corresponding devices as described with respect to FIGS. 1 through 3.

At 405, the UE 115-c may identify that the UE 115-c is configured to communicate via both a MCG and a SCG. In some cases, the identification may be based on the UE 115-c receiving a SIB message from the base station 105-a. The MCG may be associated with the base station 105-a, and the SCG may be associated with one or more different base stations 105-c. In some cases, the MCG is associated with a first RAT, such as LTE, and the SCG is associated with a second RAT, such as 5G.

At 410, the UE 115-c may receive, from the base station 105-c, a configuration for a secondary cell group dormancy state including a plurality of dormancy modes for communicating via the secondary cell group. The configuration may include an indication of one or more signal measurement thresholds that the UE 115-c is to use to determine in which of the plurality of dormancy modes that the UE 115-c is to operate. The configuration may also include an indication of resources (e.g., reference signal resources, control channel resources, etc.) that the UE 115-c may transmit on or monitor while in the dormancy mode and the variations of resources between modes. The configuration may be transmitted by the base station 105-c via control signaling.

At 415, the UE 115-c may determine that the UE 115-c is to transition to a first dormancy mode of the secondary cell group dormancy state based on the configuration. In some cases, the UE 115-c may transition to the first dormancy mode in response to receiving the configuration. In some examples, the UE 115—may transition to the first dormancy mode based on one or more signal measurements relative to one of the thresholds in the configuration, a condition detected by the UE 115-a (e.g., a bursty traffic condition, an overheating condition, etc.). In some examples, the UE 115-*c* may transmit a request to transition to the dormancy mode, and the base station 105-*c* may transmit the configuration in response to the request.

At 420, the UE 115-*c* may communicate via the secondary cell group in accordance with the configuration for the first dormancy mode. This may include performing RRM, RLM, and BFD procedures for each of the dormancy modes, performing layer 1 measurements, uplink control information reporting, etc. in some of the dormancy modes. Depending on the dormancy mode, the UE 115-*c* may receive control information via the MCG and the control information may be applied to the SCG (e.g., power control, beam adjustment, or timing parameters). In other examples, the UE 115-*c* may receive such control information in the SCG (e.g., mode 2).

Figure 5:
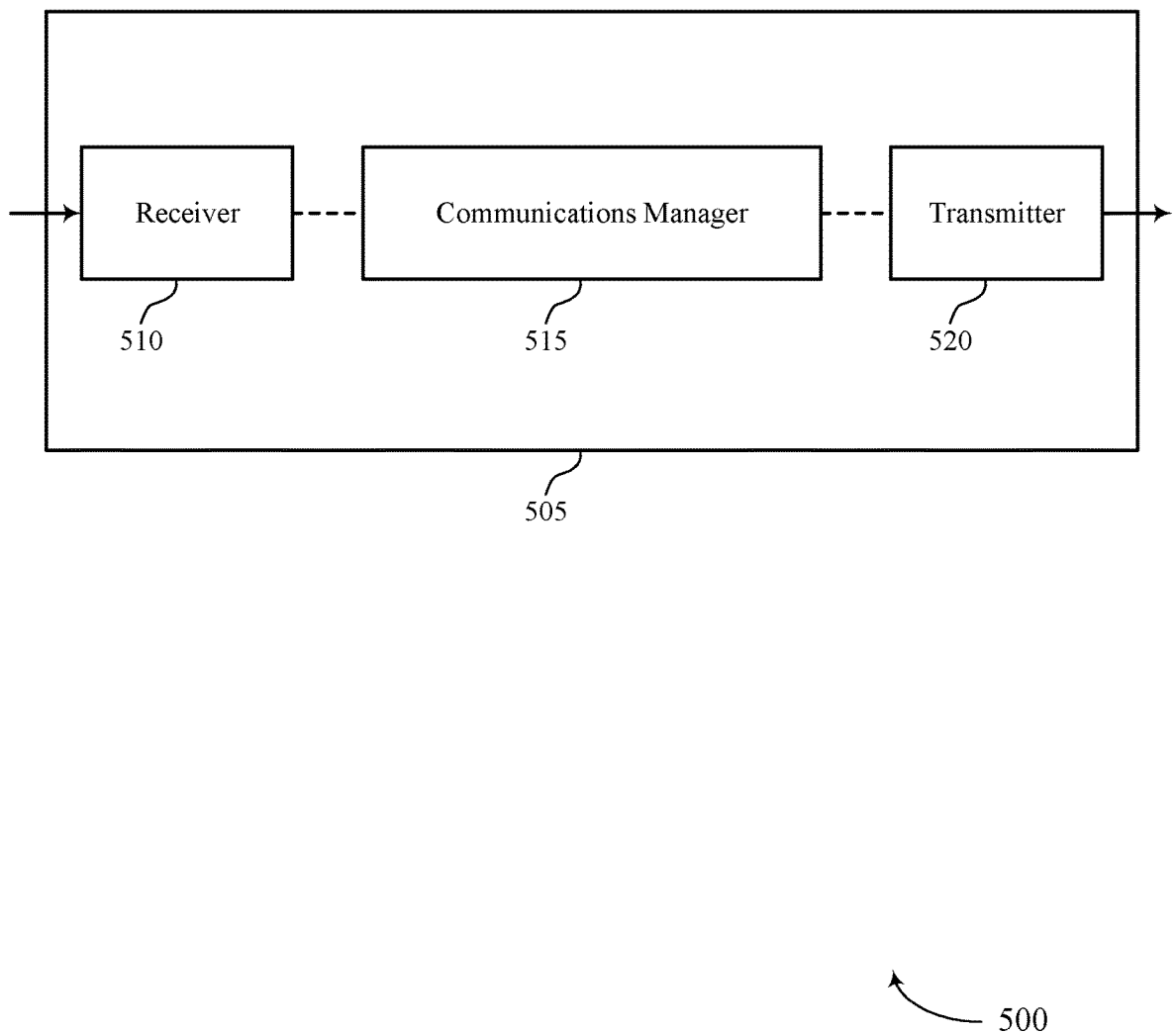
FIGS. 5 and 6 show block diagrams of devices that support multimode secondary cell group dormancy in accordance with aspects of the present disclosure.

FIG. 5 shows a block diagram 500 of a device 505 that supports multimode secondary cell group dormancy in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to multimode secondary cell group dormancy, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify that the UE is configured to communicate via a secondary cell group, receive, from a base station, a configuration for a secondary cell group power saving state including a set of power saving modes for communicating via the secondary cell group, determine that the UE is to transition to a first power saving mode of the secondary cell group power saving state based on the configuration, and communicate via the secondary cell group in accordance with the configuration for the first power saving mode. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
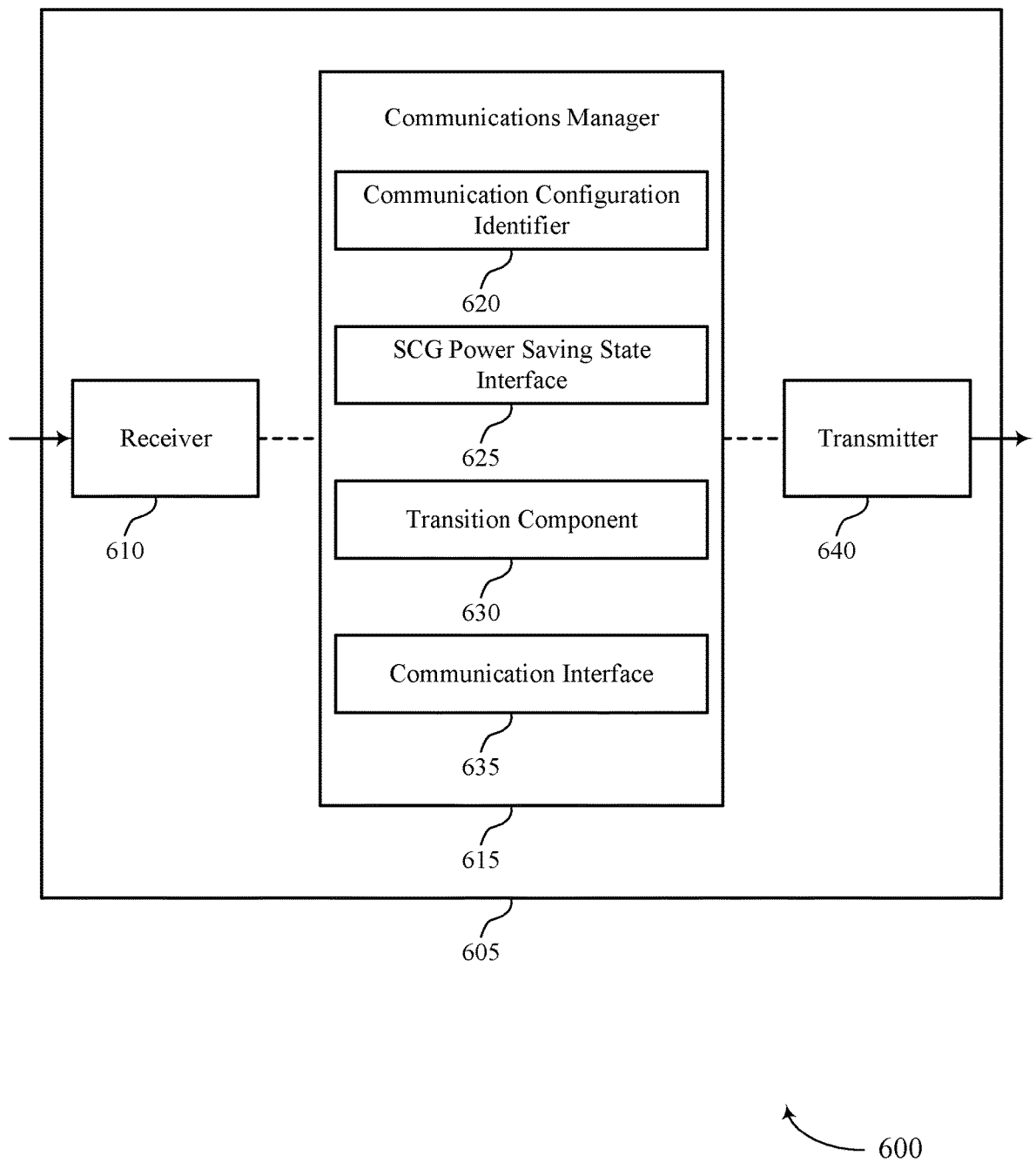

FIG. 6 shows a block diagram 600 of a device 605 that supports multimode secondary cell group dormancy in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to multimode secondary cell group dormancy, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a communication configuration identifier 620, a SCG power saving state interface 625, a transition component 630, and a communication interface 635. The communications manager 615 may be an example of aspects of the communications manager 810 described herein.

The communication configuration identifier 620 may identify that the UE is configured to communicate via a secondary cell group.

The SCG power saving state interface 625 may receive, from a base station, a configuration for a secondary cell group power saving state including a set of power saving modes for communicating via the secondary cell group.

The transition component 630 may determine that the UE is to transition to a first power saving mode of the secondary cell group power saving state based on the configuration.

The communication interface 635 may communicate via the secondary cell group in accordance with the configuration for the first power saving mode.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
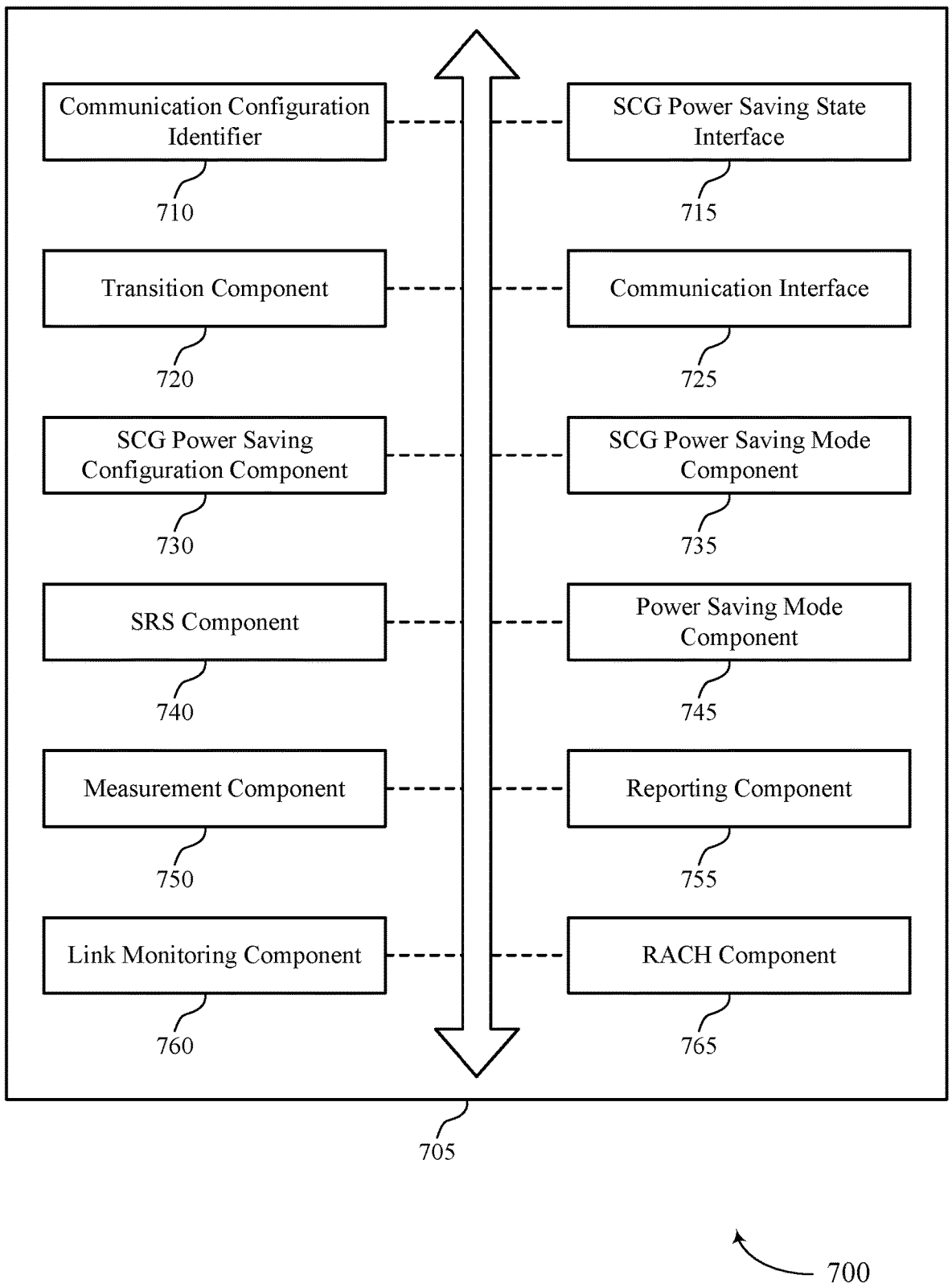
FIG. 7 shows a block diagram of a communications manager that supports multimode secondary cell group dormancy in accordance with aspects of the present disclosure.

FIG. 7 shows a block diagram 700 of a communications manager 705 that supports multimode secondary cell group dormancy in accordance with aspects of the present disclosure. The communications manager 705 may be an example of aspects of a communications manager 515, a communications manager 615, or a communications manager 810 described herein. The communications manager 705 may include a communication configuration identifier 710, a SCG power saving state interface 715, a transition component 720, a communication interface 725, a SCG power saving configuration component 730, a SCG power saving mode component 735, a SRS component 740, a power saving mode component 745, a measurement component 750, a reporting component 755, a link monitoring component 760, and a RACH component 765. Each of these modules may communicate, directly or indirectly, with one another (e.g., via one or more buses).

The communication configuration identifier 710 may identify that the UE is configured to communicate via a secondary cell group.

The SCG power saving state interface 715 may receive, from a base station, a configuration for a secondary cell group power saving state including a set of power saving modes for communicating via the secondary cell group.

In some examples, the configuration may include three power saving modes for the secondary cell group power saving state.

In some examples, the SCG power saving state interface 715 may receive an indication of a downlink resource of the secondary cell group for monitoring in one or more of the set of power saving modes.

In some examples, the SCG power saving state interface 715 may receive an indication of an uplink resource of the secondary cell group for transmitting control information in one or more of the set of power saving modes.

In some examples, the SCG power saving state interface 715 may receive an indication of whether the UE is to transmit a physical uplink control channel message on a first resource of a PSCell of the secondary cell group for each of the set of power saving modes.

In some examples, the SCG power saving state interface 715 may receive an indication of whether the UE is to monitor for receipt of a downlink message on a second resource of the PSCell of the secondary cell group for each of the set of power saving modes.

The transition component 720 may determine that the UE is to transition to a first power saving mode of the secondary cell group power saving state based on the configuration.

In some examples, the transition component 720 may determine that a signal measurement corresponding to the secondary cell group satisfies a signal measurement threshold.

In some examples, the transition component 720 may transition, based on determining the signal measurement satisfies the signal measurement threshold, to the first power saving mode that is associated with a lower communication activity level than a second power saving mode of the set of power saving modes.

In some examples, the transition component 720 may determine that a signal measurement corresponding to the secondary cell group fails to satisfy a signal measurement threshold.

In some examples, the transition component 720 may transition, based on determining that the signal measurement fails to satisfy the signal measurement threshold, to the first power saving mode that is associated with a higher communication activity level than a second power saving mode of the set of power saving modes.

In some examples, the transition component 720 may compare a signal measurement corresponding to the secondary cell group to a signal measurement threshold.

In some examples, the transition component 720 may determine that the UE is to transition from the first power saving mode to a second power saving mode of the set of power saving modes based on the comparing.

In some examples, the transition component 720 may receive from the base station, an instruction to transition to the first power saving mode or from the first power saving mode to a second power saving mode of the set of power saving modes.

In some examples, the transition component 720 may transmit, to the base station, a request to transition to the secondary cell group power saving state based on an overheating condition, a traffic condition, a condition associated with the secondary cell group, or a combination thereof, where the instruction to transition to the first power saving mode is received based on transmitting the request.

The communication interface 725 may communicate via the secondary cell group in accordance with the configuration for the first power saving mode.

In some cases, the configuration indicates one or more signal measurement thresholds to be used in determining to transition among the set of power saving modes.

In some examples, each of the set of power saving modes is associated with a different communication activity level in the secondary cell group.

In some cases, each different communication activity level corresponds to whether the UE is to transmit an uplink control channel message on a first resource of the secondary cell group, whether the UE is to monitor for receipt of a downlink message on a second resource of the secondary cell group, or both.

The SCG power saving mode component 735 may perform a radio link monitoring procedure, a beam failure detection procedure, or both in accordance with the first power saving mode.

In some examples, the SCG power saving mode component 735 may monitor for receipt of a downlink control message on a second resource of the PSCell of the secondary cell group in accordance with the received configuration for the first power saving mode.

In some examples, the SCG power saving mode component 735 may receive a downlink control message on a resource of a PSCell of the secondary cell group in accordance with the received configuration for the first power saving mode, where the downlink control message indicates one or more timing adjustment parameters, one or more power control parameters, one or more beam adjustment parameters, or a combination thereof.

In some examples, the SCG power saving mode component 735 may receive a downlink control message on a resource of the master cell group in accordance with the received configuration for the first power saving mode, where the downlink control message indicates one or more timing adjustment parameters, one or more power control parameters, one or more beam adjustment parameters, or a combination thereof. The SRS component 740 may transmit a sounding reference signal on a PSCell of the secondary cell group to a secondary node of the secondary cell group in accordance with the first power saving mode.

In some examples, the SRS component 740 may transmit, to the base station, a sounding reference signal, where the instruction to transition is received from the base station based on transmitting the sounding reference signal.

The power saving mode component 745 may identify that the UE is to refrain from transmitting a physical uplink control channel message on a first resource of a PSCell of the secondary cell group in accordance with the received configuration for the first power saving mode.

In some examples, the power saving mode component 745 may identify that the UE is to refrain from monitoring for receipt of a downlink control message on a second resource of the PSCell of the secondary cell group in accordance with the received configuration for the first power saving mode.

In some examples, the power saving mode component 745 may transmit a physical uplink control channel message on a first resource of a PSCell of the secondary cell group in accordance with the first power saving mode.

In some examples, the power saving mode component 745 may transmit a physical uplink control channel message on a first resource of a PSCell of the secondary cell group in accordance with the received configuration for the first power saving mode.

In some examples, the power saving mode component 745 may measure both the first signal and the second signal based on the PSCell operating in a first frequency and the secondary cell operating in a second frequency different from the first frequency.

In some examples, the power saving mode component 745 may measure the first signal and refraining from measuring the second signal based on the PSCell and the secondary cell operating in a first frequency.

The measurement component 750 may measure, in the first power saving mode, a first signal transmitted using a downlink resource of a PSCell of the secondary cell group, a second signal transmitted using a downlink resource of a secondary cell of the secondary cell group, or measuring both the first signal and the second signal. The reporting component 755 may transmit a result of the measuring on an uplink resource of the PSCell.

The link monitoring component 760 may detect a beam failure or a radio link failure while the UE is in the first power saving mode that is associated with a lowest communication activity level of the set of power saving modes. The RACH component 765 may transmit, to the base station, a random access request based on detecting the beam failure or the radio link failure.

Figure 8:
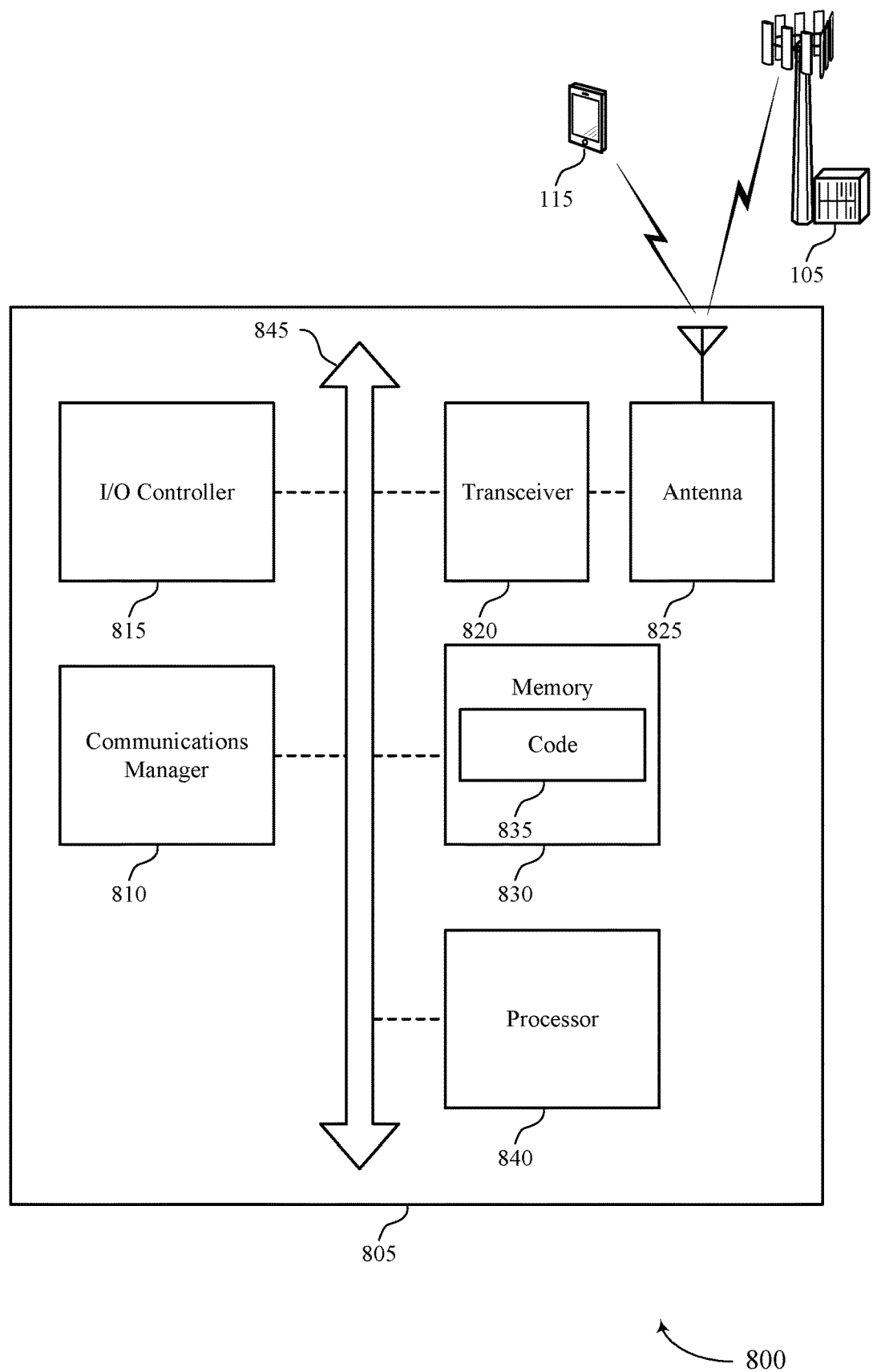
FIG. 8 shows a diagram of a system including a device that supports multimode secondary cell group dormancy in accordance with aspects of the present disclosure.

FIG. 8 shows a diagram of a system 800 including a device 805 that supports multimode secondary cell group dormancy in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that the UE is configured to communicate via a secondary cell group, receive, from a base station, a configuration for a secondary cell group power saving state including a set of power saving modes for communicating via the secondary cell group, determine that the UE is to transition to a first power saving mode of the secondary cell group power saving state based on the configuration, and communicate via the secondary cell group in accordance with the configuration for the first power saving mode.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting multimode secondary cell group dormancy).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
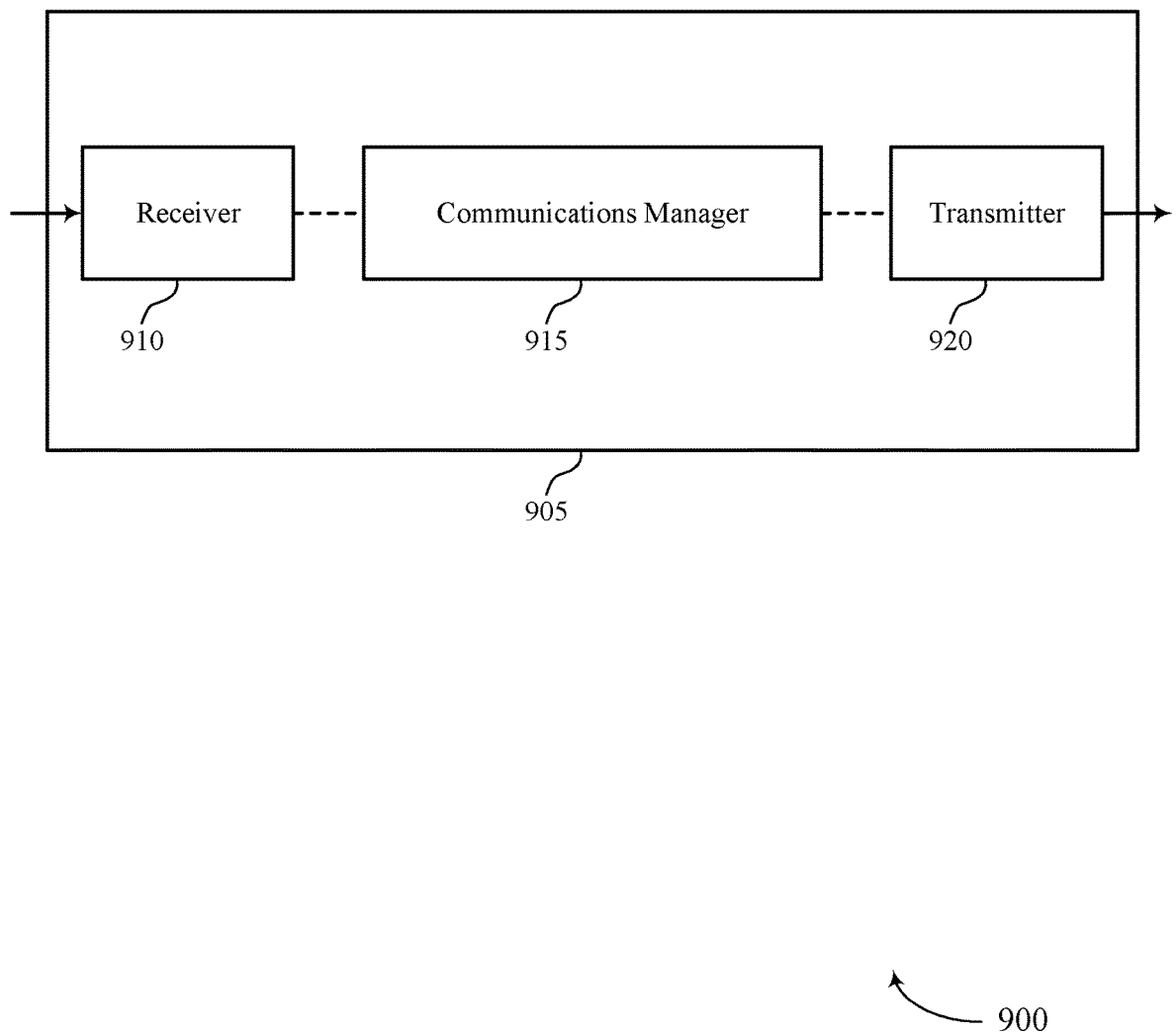
FIGS. 9 and 10 show block diagrams of devices that support multimode secondary cell group dormancy in accordance with aspects of the present disclosure.

FIG. 9 shows a block diagram 900 of a device 905 that supports multimode secondary cell group dormancy in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multimode secondary cell group dormancy, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify that the base station is in communication with a UE as part of a master cell group, transmit, to the UE, a configuration for a secondary cell group power saving state including a set of power saving modes for a secondary cell group with which the UE is in communication, and communicate with the UE in accordance with the configuration. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
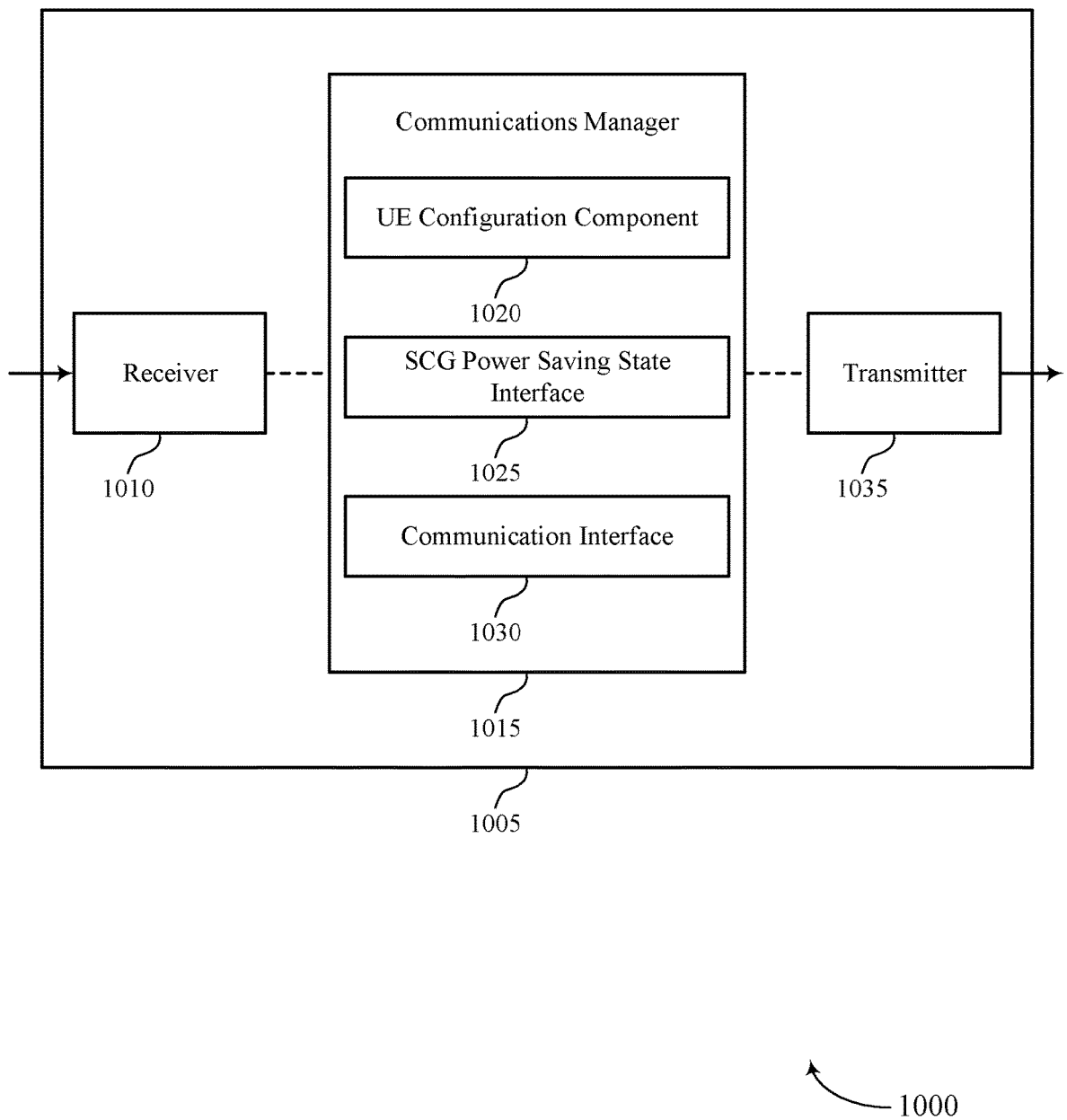

FIG. 10 shows a block diagram 1000 of a device 1005 that supports multimode secondary cell group dormancy in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to multimode secondary cell group dormancy, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a UE configuration component 1020, a SCG power saving state interface 1025, and a communication interface 1030. The communications manager 1015 may be an example of aspects of the communications manager 1210 described herein.

The UE configuration component 1020 may identify that the base station is in communication with a UE as part of a master cell group.

The SCG power saving state interface 1025 may transmit, to the UE, a configuration for a secondary cell group power saving state including a set of power saving modes for a secondary cell group with which the UE is in communication.

The communication interface 1030 may communicate with the UE in accordance with the configuration.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
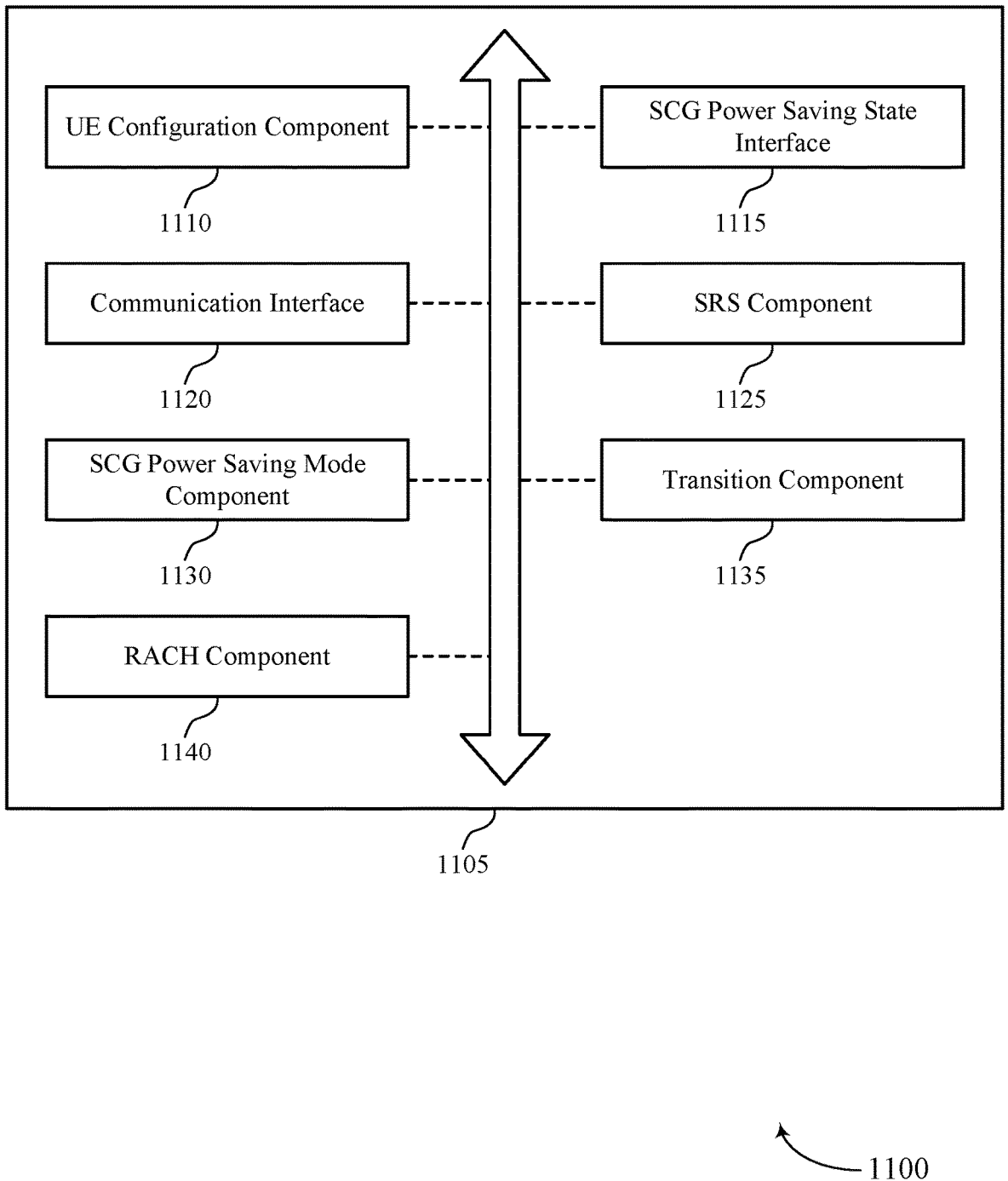
FIG. 11 shows a block diagram of a communications manager that supports multimode secondary cell group dormancy in accordance with aspects of the present disclosure.

FIG. 11 shows a block diagram 1100 of a communications manager 1105 that supports multimode secondary cell group dormancy in accordance with aspects of the present disclosure. The communications manager 1105 may be an example of aspects of a communications manager 915, a communications manager 1015, or a communications manager 1210 described herein. The communications manager 1105 may include a UE configuration component 1110, a SCG power saving state interface 1115, a communication interface 1120, a SRS component 1125, a SCG power saving mode component 1130, a transition component 1135, and a RACH component 1140. Each of these modules may communicate, directly or indirectly, with one another (e.g., via one or more buses).

The UE configuration component 1110 may identify that the base station is in communication with a UE as part of a master cell group. The SCG power saving state interface 1115 may transmit, to the UE, a configuration for a secondary cell group power saving state including a set of power saving modes for a secondary cell group with which the UE is in communication.

In some examples, the SCG power saving state interface 1115 may include, within the configuration, one or more signal measurement thresholds to be used in determining to transition among the set of power saving modes.

In some examples, the SCG power saving state interface 1115 may transmit a power saving mode configuration for three power saving modes.

In some examples, the SCG power saving state interface 1115 may transmit an indication of a downlink resource of the secondary cell group for UE monitoring in one or more of the set of power saving modes.

In some examples, the SCG power saving state interface 1115 may transmit an indication of an uplink resource of the secondary cell group that the UE is to use to transmit control information in one or more of the set of power saving modes.

In some examples, the SCG power saving state interface 1115 may transmit an indication that the UE is to perform a radio link monitoring procedure, a beam failure detection procedure, or both in each of the set of power saving modes.

In some examples, the SCG power saving state interface 1115 may transmit an indication of whether the UE is to transmit a physical uplink control channel message on a first resource of a PSCell of the secondary cell group for each of the set of power saving modes.

In some examples, the SCG power saving state interface 1115 may transmit an indication of whether the UE is to monitor for receipt of a downlink message on a second resource of the PSCell of the secondary cell group for each of the set of power saving modes.

In some examples, the SCG power saving state interface 1115 may transmit a downlink control message on a resource of the master cell group in accordance with the transmitted configuration, where the downlink control message indicates one or more timing adjustment parameters, one or more power control parameters, one or more beam adjustment parameters, or a combination thereof.

In some cases, the power saving mode configuration indicates that each of the set of power saving modes is associated with a different communication activity level in the secondary cell group.

In some cases, each different communication activity level corresponds to whether the UE is to transmit an uplink control channel message on a first resource of the secondary cell group, the UE is to monitor for receipt of a downlink message on a second resource of the secondary cell group, or both.

The communication interface 1120 may communicate with the UE in accordance with the configuration. The SRS component 1125 may receive, from the UE on a secondary node of the base station, a sounding reference signal in accordance with the configuration.

The SCG power saving mode component 1130 may transmit a configuration for a first power saving mode that indicates that the UE is to refrain from transmitting a physical uplink control channel message on a first resource of a PSCell of the secondary cell group and that the UE is to refrain from monitoring for receipt of a downlink control message on a second resource of the PSCell of the secondary cell group.

In some examples, the SCG power saving mode component 1130 may transmit a configuration for a first power saving mode that indicates that the UE is to transmit a physical uplink control channel message on a first resource of a PSCell of the secondary cell group and that the UE is to refrain from monitoring for receipt of a downlink control message on a second resource of the PSCell of the secondary cell group.

In some examples, the SCG power saving mode component 1130 may transmit a configuration for a first power saving mode that indicates that the UE is to transmit a physical uplink control channel message on a first resource of a PSCell of the secondary cell group and monitor for receipt of a downlink control message on a second resource of the PSCell of the secondary cell group.

The transition component 1135 may transmit, to the UE, an instruction to transition to a first power saving mode of the set of power saving modes or from the first power saving mode to a second power saving mode of the set of power saving modes.

In some examples, the transition component 1135 may receive, from the UE on a secondary node of the base station, a sounding reference signal, where the instruction to transition is transmitted to the UE based on receiving the sounding reference signal.

In some examples, the transition component 1135 may receive, from the UE, a request to transition to the secondary cell group power saving state, where the instruction to transition is transmitted to the UE based on receiving the request.

The RACH component 1140 may receive, from the UE while the UE is operating in one of the sets of power saving modes, a random access request. In some examples, the RACH component 1140 may transmit, to the UE, a random access response based on receiving the random access request.

Figure 12:
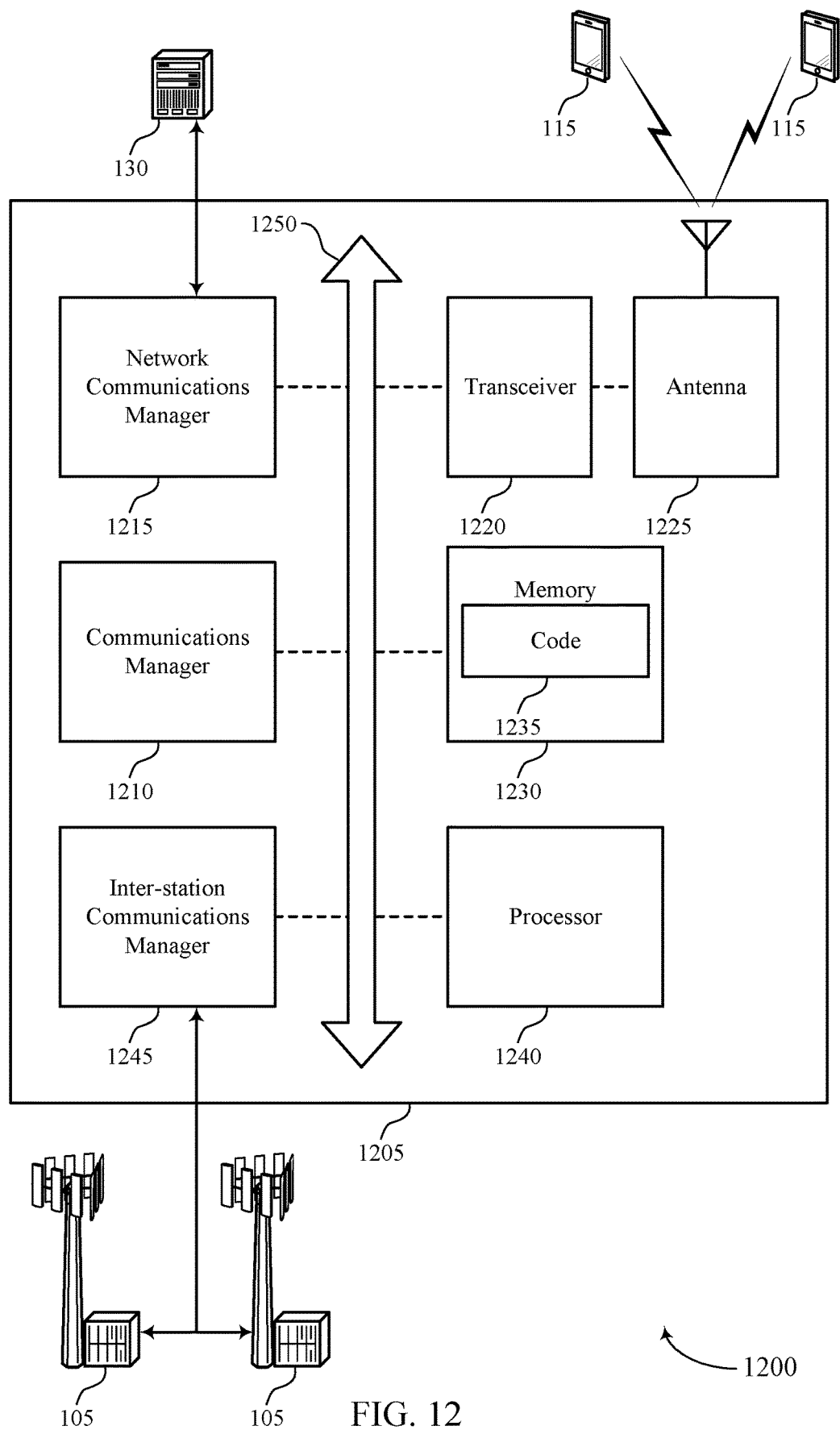
FIG. 12 shows a diagram of a system including a device that supports multimode secondary cell group dormancy in accordance with aspects of the present disclosure.

FIG. 12 shows a diagram of a system 1200 including a device 1205 that supports multimode secondary cell group dormancy in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify that the base station is in communication with a UE as part of a master cell group, transmit, to the UE, a configuration for a secondary cell group power saving state including a set of power saving modes for a secondary cell group with which the UE is in communication, and communicate with the UE in accordance with the configuration.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting multimode secondary cell group dormancy).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
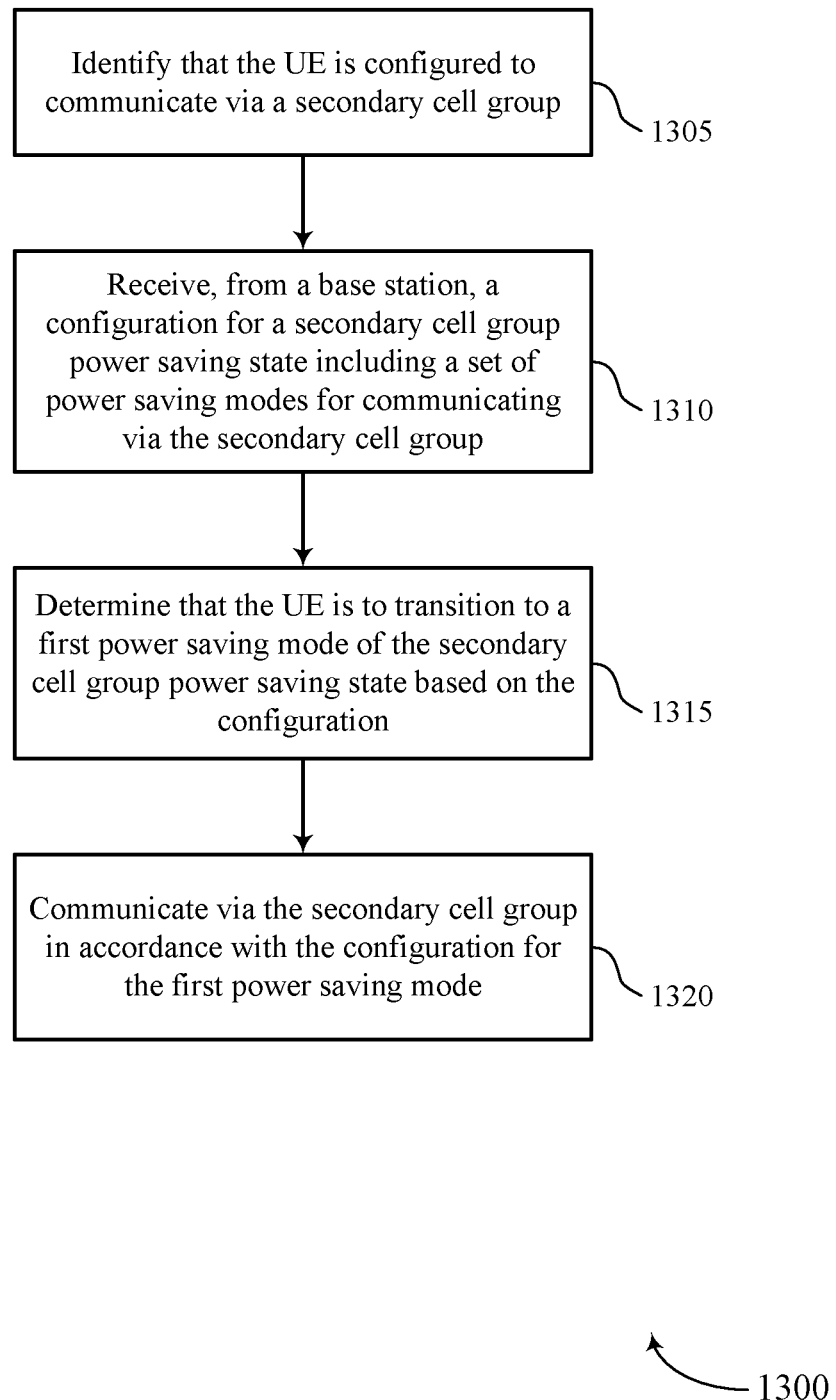
FIGS. 13 and 14 show flowcharts illustrating methods that support multimode secondary cell group dormancy in accordance with aspects of the present disclosure.

FIG. 13 shows a flowchart illustrating a method 1300 that supports multimode secondary cell group dormancy in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is configured to communicate via a secondary cell group. The operations of 1305 may be performed according to the methods described herein. In some examples, aspects of the operations of 1305 may be performed by a communication configuration identifier as described with reference to FIGS. 5 through 8.

At 1310, the UE may receive, from a base station, a configuration for a secondary cell group power saving state including a set of power saving modes for communicating via the secondary cell group. The operations of 1310 may be performed according to the methods described herein. In some examples, aspects of the operations of 1310 may be performed by a SCG power saving state interface as described with reference to FIGS. 5 through 8.

At 1315, the UE may determine that the UE is to transition to a first power saving mode of the secondary cell group power saving state based on the configuration. The operations of 1315 may be performed according to the methods described herein. In some examples, aspects of the operations of 1315 may be performed by a transition component as described with reference to FIGS. 5 through 8.

At 1320, the UE may communicate via the secondary cell group in accordance with the configuration for the first power saving mode. The operations of 1320 may be performed according to the methods described herein. In some examples, aspects of the operations of 1320 may be performed by a communication interface as described with reference to FIGS. 5 through 8.

Figure 14:
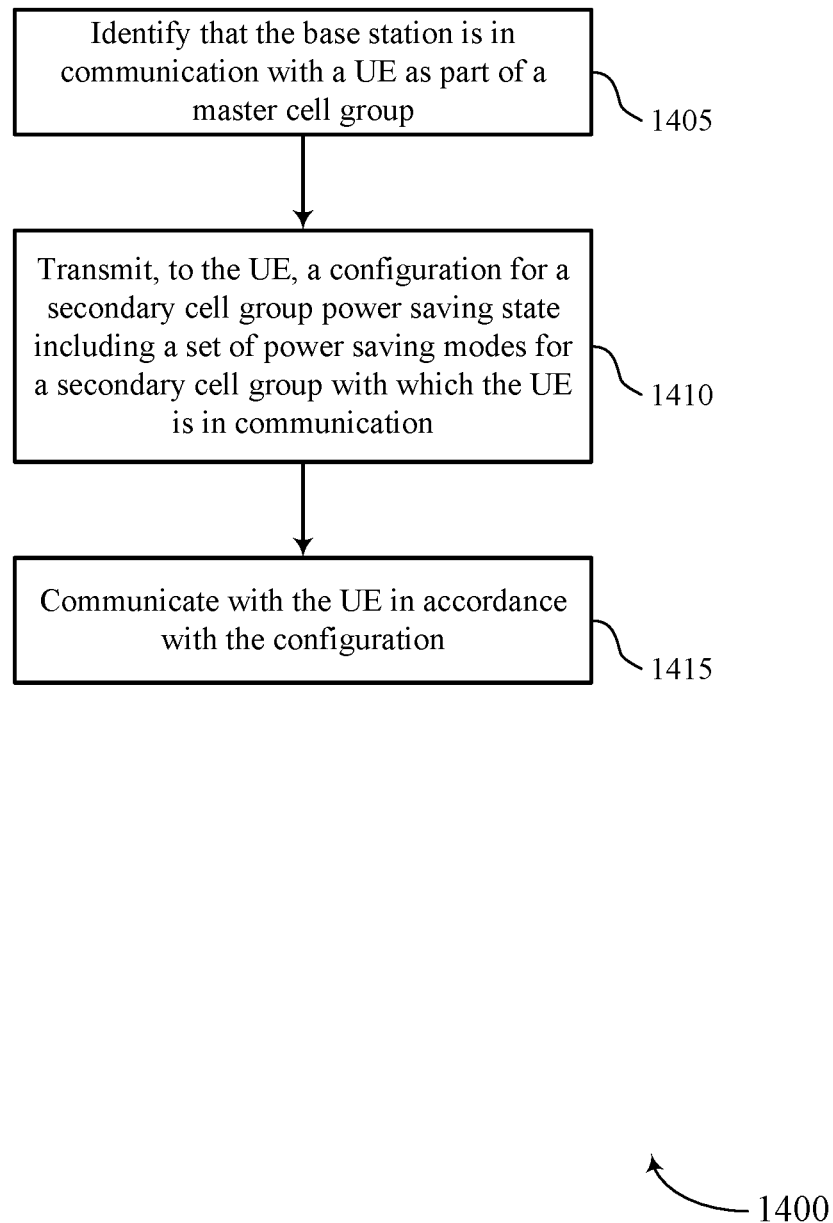

FIG. 14 shows a flowchart illustrating a method 1400 that supports multimode secondary cell group dormancy in accordance with aspects of the present disclosure. The operations of method 1400 may be implemented by a base station 105 or its components as described herein. For example, the operations of method 1400 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1405, the base station may identify that the base station is in communication with a UE as part of a master cell group. The operations of 1405 may be performed according to the methods described herein. In some examples, aspects of the operations of 1405 may be performed by a UE configuration component as described with reference to FIGS. 9 through 12.

At 1410, the base station may transmit, to the UE, a configuration for a secondary cell group power saving state including a set of power saving modes for a secondary cell group with which the UE is in communication. The operations of 1410 may be performed according to the methods described herein. In some examples, aspects of the operations of 1410 may be performed by a SCG power saving state interface as described with reference to FIGS. 9 through 12.

At 1415, the base station may communicate with the UE in accordance with the configuration. The operations of 1415 may be performed according to the methods described herein. In some examples, aspects of the operations of 1415 may be performed by a communication interface as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a user equipment (UE), comprising: identifying that the UE is configured to communicate via a secondary cell group; receiving, from a base station, a configuration for a secondary cell group power saving state including a plurality of power saving modes for communicating via the secondary cell group; determining that the UE is to transition to a first power saving mode of the secondary cell group power saving state based at least in part on the configuration; and communicating via the secondary cell group in accordance with the configuration for the first power saving mode.

Aspect 2: The method of aspect 1, wherein the configuration indicates one or more signal measurement thresholds to be used in determining to transition among the plurality of power saving modes.

Aspect 3: The method of any one of aspects 1 through 2, wherein each of the plurality of power saving modes is associated with a different communication activity level in the secondary cell group.

Aspect 4: The method of aspect 3, wherein each different communication activity level corresponds to whether the UE is to transmit an uplink control channel message on a first resource of the secondary cell group, whether the UE is to monitor for receipt of a downlink message on a second resource of the secondary cell group, or both.

Aspect 5: The method of any one of aspects 1 through 4, wherein the configuration comprises three power saving modes for the secondary cell group power saving state.

Aspect 6: The method of any one of aspects 1 through 5, wherein receiving the configuration comprises: receiving an indication of a downlink resource of the secondary cell group for monitoring in one or more of the plurality of power saving modes.

Aspect 7: The method of any one of aspects 1 through 6, wherein receiving the configuration comprises: receiving an indication of an uplink resource of the secondary cell group for transmitting control information in one or more of the plurality of power saving modes.

Aspect 8: The method of any one of aspects 1 through 7, further comprising: performing a radio link monitoring procedure, a beam failure detection procedure, or both in accordance with the first power saving mode.

Aspect 9: The method of any one of aspects 1 through 8, wherein receiving the configuration comprises: receiving an indication of whether the UE is to transmit a physical uplink control channel message on a first resource of a PSCell of the secondary cell group for each of the plurality of power saving modes; and receiving an indication of whether the UE is to monitor for receipt of a downlink message on a second resource of the PSCell of the secondary cell group for each of the plurality of power saving modes.

Aspect 10: The method of any one of aspects 1 through 9, wherein communicating via the secondary cell group comprises: transmitting a sounding reference signal on the PSCell of the secondary cell group to the secondary node of the secondary cell group in accordance with the first power saving mode.

Aspect 11: The method of any one of aspects 1 through 10, wherein determining that the UE is to transition to the first power saving mode further comprises: identifying that the UE is to refrain from transmitting a physical uplink control channel message on a first resource of a PSCell of the secondary cell group in accordance with the received configuration for the first power saving mode; and identifying that the UE is to refrain from monitoring for receipt of a downlink control message on a second resource of the PSCell of the secondary cell group in accordance with the received configuration for the first power saving mode.

Aspect 12: The method of any one of aspects 1 through 10, further comprising: transmitting a physical uplink control channel message on a first resource of a PSCell of the secondary cell group in accordance with the first power saving mode; and identifying that the UE is to refrain from monitoring for receipt of a downlink control message on a second resource of the PSCell of the secondary cell group in accordance with the received configuration for the first power saving mode.

Aspect 13: The method of any one of aspects 1 through 10, further comprising: transmitting a physical uplink control channel message on a first resource of a PSCell of the secondary cell group in accordance with the received configuration for the first power saving mode; and monitoring for receipt of a downlink control message on a second resource of the PSCell of the secondary cell group in accordance with the received configuration for the first power saving mode.

Aspect 14: The method of any one of aspects 1 through 10 and 13, further comprising: receiving a downlink control message on a resource of a PSCell of the secondary cell group in accordance with the received configuration for the first power saving mode, wherein the downlink control message indicates one or more timing adjustment parameters, one or more power control parameters, one or more beam adjustment parameters, or a combination thereof.

Aspect 15: The method of any one of aspects 1 through 10 and 12, further comprising: receiving a downlink control message on a resource of a master cell group in accordance with the received configuration for the first power saving mode, wherein the downlink control message indicates one or more timing adjustment parameters, one or more power control parameters, one or more beam adjustment parameters, or a combination thereof.

Aspect 16: The method of any one of aspects 1 through 10, 12, and 13, further comprising: measuring, in the first power saving mode, a first signal transmitted using a downlink resource of a PSCell of the secondary cell group, a second signal transmitted using a downlink resource of a secondary cell of the secondary cell group, or measuring both the first signal and the second signal; and transmitting a result of the measuring on an uplink resource of the PSCell.

Aspect 17: The method of aspect 16, further comprising: measuring both the first signal and the second signal based at least in part on the PSCell operating in a first frequency and the secondary cell operating in a second frequency different from the first frequency.

Aspect 18: The method of aspect 16, further comprising: measuring the first signal and refraining from measuring the second signal based at least in part on the PSCell and the secondary cell operating in a first frequency.

Aspect 19: The method of any one of aspects 1 through 18, wherein determining that the UE is to transition to the first power saving mode comprises: determining that a signal measurement corresponding to the secondary cell group satisfies a signal measurement threshold; and transitioning, based at least in part on determining the signal measurement satisfies the signal measurement threshold, to the first power saving mode that is associated with a lower communication activity level than a second power saving mode of the plurality of power saving modes.

Aspect 20: The method of any one of aspects 1 through 19, wherein determining that the UE is to transition to the first power saving mode comprises: determining that a signal measurement corresponding to the secondary cell group fails to satisfy a signal measurement threshold; and transitioning, based at least in part on determining that the signal measurement fails to satisfy the signal measurement threshold, to the first power saving mode that is associated with a higher communication activity level than a second power saving mode of the plurality of power saving modes.

Aspect 21: The method of any one of aspects 1 through 20, further comprising: comparing a signal measurement corresponding to the secondary cell group to a signal measurement threshold; and determining that the UE is to transition from the first power saving mode to a second power saving mode of the plurality of power saving modes based at least in part on the comparing.

Aspect 22: The method of any one of aspects 1 through 21, further comprising: receiving from the base station, an instruction to transition to the first power saving mode or from the first power saving mode to a second power saving mode of the plurality of power saving modes.

Aspect 23: The method of aspect 22, further comprising: transmitting, to a secondary node of the base station via a secondary cell group, a sounding reference signal, wherein the instruction to transition is received from the base station based at least in part on transmitting the sounding reference signal.

Aspect 24: The method of aspect 22, further comprising: transmitting, to the base station, a request to transition to the secondary cell group power saving state based at least in part on an overheating condition, a traffic condition, a condition associated with the secondary cell group, or a combination thereof, wherein the instruction to transition to the first power saving mode is received based at least in part on transmitting the request.

Aspect 25: The method of any one of aspects 1 through 24, further comprising: detecting a beam failure or a radio link failure while the UE is in the first power saving mode that is associated with a lowest communication activity level of the plurality of power saving modes; and transmitting, to the base station, a random access request based at least in part on detecting the beam failure or the radio link failure.

Aspect 26: A method for wireless communications at a base station, comprising: identifying that the base station is in communication with a user equipment (UE) as part of a master cell group; transmitting, to the UE, a configuration for a secondary cell group power saving state including a plurality of power saving modes for a secondary cell group with which the UE is in communication; and communicating with the UE in accordance with the configuration.

Aspect 27: The method of aspect 26, further comprising: including, within the configuration, one or more signal measurement thresholds to be used in determining to transition among the plurality of power saving modes.

Aspect 28: The method of aspect any one of aspects 26 through 27, wherein the power saving mode configuration indicates that each of the plurality of power saving modes is associated with a different communication activity level in the secondary cell group.

Aspect 29: The method of aspect 28, wherein each different communication activity level corresponds to whether the UE is to transmit an uplink control channel message on a first resource of the secondary cell group, the UE is to monitor for receipt of a downlink message on a second resource of the secondary cell group, or both.

Aspect 30: The method of any one of aspects 26 through 29, wherein transmitting the configuration comprises: transmitting a power saving mode configuration for three power saving modes.

Aspect 31: The method of any one of aspects 26 through 30, wherein transmitting the configuration comprises: transmitting an indication of a downlink resource of the secondary cell group for UE monitoring in one or more of the plurality of power saving modes.

Aspect 32: The method of any one of aspects 26 through 31, wherein transmitting the configuration comprises: transmitting an indication of an uplink resource of the secondary cell group that the UE is to use to transmit control information in one or more of the plurality of power saving modes.

Aspect 33: The method of any one of aspects 26 through 32, wherein transmitting the configuration comprises: transmitting an indication that the UE is to perform a radio link monitoring procedure, a beam failure detection procedure, or both in each of the plurality of power saving modes.

Aspect 34: The method of any one of aspects 26 through 33, wherein transmitting the configuration comprises: transmitting an indication of whether the UE is to transmit a physical uplink control channel message on a first resource of a PSCell of the secondary cell group for each of the plurality of power saving modes; and transmitting an indication of whether the UE is to monitor for receipt of a downlink message on a second resource of the PSCell of the secondary cell group for each of the plurality of power saving modes.

Aspect 35: The method of any one of aspects 26 through 34, wherein communicating with the UE comprises: receiving, from the UE on a secondary node of the base station, a sounding reference signal in accordance with the configuration.

Aspect 36: The method of any one of aspects 26 through 35, wherein transmitting the configuration comprises: transmitting a configuration for a first power saving mode that indicates that the UE is to refrain from transmitting a physical uplink control channel message on a first resource of a PSCell of the secondary cell group and that the UE is to refrain from monitoring for receipt of a downlink control message on a second resource of the PSCell of the secondary cell group.

Aspect 37: The method of any one of aspects 26 through 35, wherein transmitting the configuration comprises: transmitting a configuration for a first power saving mode that indicates that the UE is to transmit a physical uplink control channel message on a first resource of a PSCell of the secondary cell group and that the UE is to refrain from monitoring for receipt of a downlink control message on a second resource of the PSCell of the secondary cell group.

Aspect 38: The method of any one of aspects 26 through 35, wherein transmitting the configuration comprises: transmitting a configuration for a first power saving mode that indicates that the UE is to transmit a physical uplink control channel message on a first resource of a PSCell of the secondary cell group and monitor for receipt of a downlink control message on a second resource of the PSCell of the secondary cell group.

Aspect 39: The method of any one of aspects 26 through 35 and 37, further comprising: transmitting a downlink control message on a resource of the master cell group in accordance with the transmitted configuration, wherein the downlink control message indicates one or more timing adjustment parameters, one or more power control parameters, one or more beam adjustment parameters, or a combination thereof.

Aspect 40: The method of any one of aspects 26 through 39, further comprising: transmitting, to the UE, an instruction to transition to a first power saving mode of the plurality of power saving modes or from the first power saving mode to a second power saving mode of the plurality of power saving modes.

Aspect 41: The method of aspect 40, further comprising: receiving, from the UE on a secondary node of the base station, a sounding reference signal, wherein the instruction to transition is transmitted to the UE based at least in part on receiving the sounding reference signal.

Aspect 42: The method of aspect 40, further comprising: receiving, from the UE, a request to transition to the secondary cell group power saving state, wherein the instruction to transition is transmitted to the UE based at least in part on receiving the request.

Aspect 43: The method of any one of aspects 26 through 42, further comprising: receiving, from the UE while the UE is operating in one of the plurality of power saving modes, a random access request; and transmitting, to the UE, a random access response based at least in part on receiving the random access request.

Aspect 44: A user equipment (UE) comprising at least one means for performing a method of any one of aspects 1 through 25.

Aspect 45: A user equipment (UE) comprising a processor and memory coupled to the processor, the processor and memory configured to perform a method of any one of aspects 1 through 25.

Aspect 47: A non-transitory computer-readable medium storing code for wireless communications at a user equipment (UE) for wireless communications at a user equipment (UE) the code comprising instructions executable by a processor to perform a method of any one of aspects 1 through 25.

Aspect 48: A base station comprising at least one means for performing a method of any one of aspects 26 through 43.

Aspect 49: A base station comprising a processor and memory coupled to the processor, the processor and memory configured to perform a method of any one of aspects 26 through 43.

Aspect 51: A non-transitory computer-readable medium storing code for wireless communications at a base station for wireless communications at a base station the code comprising instructions executable by a processor to perform a method of any one of aspects 26 through 43.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended FIGURES, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying that the UE is configured to communicate via a secondary cell group;
   receiving, from a network node, a configuration for a plurality of power saving modes for communicating via the secondary cell group while operating in a secondary cell group power saving state, wherein the configuration comprises a first indication of whether the UE is to transmit an uplink control channel message on a first resource of a primary-secondary cell (PSCell) of the secondary cell group for each of the plurality of power saving modes and a second indication of whether the UE is to monitor for receipt of a downlink message on a second resource of the PSCell of the secondary cell group for each of the plurality of power saving modes;
   determining that the UE is to transition to a first power saving mode of the secondary cell group power saving state based at least in part on the configuration; and
   communicating via the secondary cell group in accordance with the configuration for the first power saving mode.

2. The method of claim 1, wherein the configuration indicates one or more signal measurement thresholds to be used in determining to transition among the plurality of power saving modes.

3. The method of claim 1, wherein each of the plurality of power saving modes is associated with a different communication activity level in the secondary cell group.

4. The method of claim 3, wherein each different communication activity level corresponds to whether the UE is to transmit the uplink control channel message on the first resource of the PSCell of the secondary cell group, whether the UE is to monitor for receipt of the downlink message on the second resource of the PSCell of the secondary cell group, or both.

5. The method of claim 1, wherein the configuration comprises three power saving modes for the secondary cell group power saving state.

6. The method of claim 1, wherein receiving the configuration comprises:
   receiving an indication of a downlink resource of the secondary cell group for monitoring in one or more of the plurality of power saving modes.

7. The method of claim 1, wherein receiving the configuration comprises:
   receiving an indication of an uplink resource of the secondary cell group for transmitting control information in one or more of the plurality of power saving modes.

8. The method of claim 1, further comprising:
   performing a radio link monitoring procedure, a beam failure detection procedure, or both in accordance with the first power saving mode.

9. The method of claim 1, wherein communicating via the secondary cell group comprises:
   transmitting a sounding reference signal on the PSCell of the secondary cell group to a secondary node of the secondary cell group in accordance with the first power saving mode.

10. The method of claim 1, wherein determining that the UE is to transition to the first power saving mode further comprises:
    identifying that the UE is to refrain from transmitting the uplink control channel message on the first resource of the PSCell of the secondary cell group in accordance with the received configuration for the first power saving mode; and
    identifying that the UE is to refrain from monitoring for receipt of the downlink message on the second resource of the PSCell of the secondary cell group in accordance with the received configuration for the first power saving mode.

11. The method of claim 1, further comprising:
    transmitting the uplink control channel message on the first resource of the PSCell of the secondary cell group in accordance with the first power saving mode; and
    identifying that the UE is to refrain from monitoring for receipt of the downlink message on the second resource of the PSCell of the secondary cell group in accordance with the received configuration for the first power saving mode.

12. The method of claim 1, further comprising:
    transmitting the uplink control channel message on the first resource of the PSCell of the secondary cell group in accordance with the received configuration for the first power saving mode; and
    monitoring for receipt of the downlink message on the second resource of the PSCell of the secondary cell group in accordance with the received configuration for the first power saving mode.

13. The method of claim 1, further comprising:
    receiving the downlink message on the second resource of the PSCell of the secondary cell group in accordance with the received configuration for the first power saving mode, wherein the downlink message indicates one or more timing adjustment parameters, one or more power control parameters, one or more beam adjustment parameters, or a combination thereof.

14. The method of claim 1, further comprising:
    receiving a downlink control message on a resource of a master cell group in accordance with the received configuration for the first power saving mode, wherein the downlink control message indicates one or more timing adjustment parameters, one or more power control parameters, one or more beam adjustment parameters, or a combination thereof.

15. The method of claim 1, further comprising:
    measuring, in the first power saving mode, a first signal transmitted using a downlink resource of the PSCell of the secondary cell group, a second signal transmitted using a downlink resource of a secondary cell of the secondary cell group, or measuring both the first signal and the second signal; and
    transmitting a result of the measuring on an uplink resource of the PSCell.

16. The method of claim 15, further comprising:
    measuring both the first signal and the second signal based at least in part on the PSCell operating in a first frequency and the secondary cell operating in a second frequency different from the first frequency.

17. The method of claim 15, further comprising:
    measuring the first signal and refraining from measuring the second signal based at least in part on the PSCell and the secondary cell operating in a first frequency.

18. The method of claim 1, wherein determining that the UE is to transition to the first power saving mode comprises:

determining that a signal measurement corresponding to the secondary cell group satisfies a signal measurement threshold; and transitioning, based at least in part on determining the signal measurement satisfies the signal measurement threshold, to the first power saving mode, wherein the first power saving mode is associated with a lower communication activity level than a second power saving mode of the plurality of power saving modes.

19. The method of claim 1, wherein determining that the UE is to transition to the first power saving mode comprises:

determining that a signal measurement corresponding to the secondary cell group fails to satisfy a signal measurement threshold; and transitioning, based at least in part on determining that the signal measurement fails to satisfy the signal measurement threshold, to the first power saving mode that is associated with a higher communication activity level than a second power saving mode of the plurality of power saving modes.

20. The method of claim 1, further comprising:

comparing a signal measurement corresponding to the secondary cell group to a signal measurement threshold; and determining that the UE is to transition from the first power saving mode to a second power saving mode of the plurality of power saving modes based at least in part on the comparing.

21. The method of claim 1, further comprising:

receiving from the network node, an instruction to transition to the first power saving mode or from the first power saving mode to a second power saving mode of the plurality of power saving modes.

22. The method of claim 21, further comprising:

transmitting, to a secondary node of the network node via the secondary cell group, a sounding reference signal, wherein the instruction to transition is received from the network node based at least in part on transmitting the sounding reference signal.

23. The method of claim 21, further comprising:

transmitting, to the network node, a request to transition to the secondary cell group power saving state based at least in part on an overheating condition, a traffic condition, a condition associated with the secondary cell group, or a combination thereof, wherein the instruction to transition to the first power saving mode is received based at least in part on transmitting the request.

24. The method of claim 1, further comprising:

detecting a beam failure or a radio link failure while the UE is in the first power saving mode, wherein the first power saving mode is associated with a lowest communication activity level of the plurality of power saving modes; and transmitting, to the network node, a random access request based at least in part on detecting the beam failure or the radio link failure.

25. A user equipment (UE), comprising:

one or more memories storing processor-executable code; and one or more processors coupled with the one or more memories and individually or collectively operable to execute the code to cause the UE to:

identify that the UE is configured to communicate via a secondary cell group while operating in a secondary cell group power saving state;

receive, from a network node, a configuration for a plurality of power saving modes for communicating via the secondary cell group, wherein the configuration comprises a first indication of whether the UE is to transmit an uplink control channel message on a first resource of a primary-secondary cell (PSCell) of the secondary cell group for each of the plurality of power saving modes and a second indication of whether the UE is to monitor for receipt of a downlink message on a second resource of the PSCell of the secondary cell group for each of the plurality of power saving modes;

determine that the UE is to transition to a first power saving mode of the secondary cell group power saving state based at least in part on the configuration; and communicate via the secondary cell group in accordance with the configuration for the first power saving mode.

26. The UE of claim 25, wherein the configuration indicates one or more signal measurement thresholds to be used in determining to transition among the plurality of power saving modes.

27. The UE of claim 25, wherein each of the plurality of power saving modes is associated with a different communication activity level in the secondary cell group.

28. A user equipment (UE), comprising:

means for identifying that the UE is configured to communicate via a secondary cell group;

means for receiving, from a network node, a configuration for a plurality of power saving modes for communicating via the secondary cell group while operating in a secondary cell group power saving state, wherein the configuration comprises a first indication of whether the UE is to transmit an uplink control channel message on a first resource of a primary-secondary cell (PSCell) of the secondary cell group for each of the plurality of power saving modes and a second indication of whether the UE is to monitor for receipt of a downlink message on a second resource of the PSCell of the secondary cell group for each of the plurality of power saving modes;

means for determining that the UE is to transition to a first power saving mode of the secondary cell group power saving state based at least in part on the configuration; and means for communicating via the secondary cell group in accordance with the configuration for the first power saving mode.

29. A non-transitory computer-readable medium storing code for wireless communications at a user equipment (UE), the code comprising instructions executable by one or more processors to:

identify that the UE is configured to communicate via a secondary cell group;

receive, from a network node, a configuration for a plurality of power saving modes for communicating via the secondary cell group while operating in a secondary cell group power saving state, wherein the configuration comprises a first indication of whether the UE is to transmit an uplink control channel message on a first resource of a primary-secondary cell (PSCell) of the secondary cell group for each of the plurality of power saving modes and a second indication of whether the UE is to monitor for receipt of a downlink message on a second resource of the PSCell of the secondary cell group for each of the plurality of power saving modes;

determine that the UE is to transition to a first power saving mode of the secondary cell group power saving state based at least in part on the configuration; and
communicate via the secondary cell group in accordance with the configuration for the first power saving mode.

* * * * *